(12) United States Patent
Kwak et al.

(10) Patent No.: US 12,322,309 B2
(45) Date of Patent: Jun. 3, 2025

(54) ELECTRONIC DEVICE WITH FLEXIBLE DISPLAY

(71) Applicant: SAMSUNG ELECTRONICS CO., LTD., Suwon-si (KR)

(72) Inventors: Myunghoon Kwak, Suwon-si (KR); Yangwook Kim, Suwon-si (KR); Jihea Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 18/109,468

(22) Filed: Feb. 14, 2023

(65) Prior Publication Data
US 2023/0260437 A1 Aug. 17, 2023

Related U.S. Application Data

(63) Continuation of application No. PCT/KR2022/018584, filed on Nov. 23, 2022.

(30) Foreign Application Priority Data

Jan. 25, 2022 (KR) .................. 10-2022-0010753
Feb. 17, 2022 (KR) .................. 10-2022-0021094

(51) Int. Cl.
G09G 3/00 (2006.01)
H04N 5/262 (2006.01)
(Continued)

(52) U.S. Cl.
CPC ............ G09G 3/035 (2020.08); H04N 5/2628 (2013.01); H04N 23/632 (2023.01);
(Continued)

(58) Field of Classification Search
CPC ............ G09G 3/035; G09G 2320/028; G09G 2320/068; G09G 2340/0492; H04N 23/695; H04N 23/632; H04N 5/2628
See application file for complete search history.

(56) References Cited

U.S. PATENT DOCUMENTS

2017/0140504 A1* 5/2017 Jeong .................... G06F 1/1624
2017/0212607 A1* 7/2017 Yoon ....................... G06F 3/147
(Continued)

FOREIGN PATENT DOCUMENTS

JP 2001-289646 10/2001
KR 10-0203284 3/1999
(Continued)

OTHER PUBLICATIONS

Extended European Search Report dated Dec. 18, 2024 issued in European Patent Application No. 22924344.9.
(Continued)

*Primary Examiner* — Benjamin C Lee
*Assistant Examiner* — Nathan P Brittingham
(74) *Attorney, Agent, or Firm* — Nixon & Vanderhye P.C.

(57) ABSTRACT

An electronic device may output, on a display module, a first graphical element corresponding to first direction information calculated based on a first sensing value received from at least one sensor module, monitor a change in a relative location between the first graphical element being currently output and the at least one sensor module in response to an occurrence of an event to change a size of a viewable region, correct second direction information calculated based on a second sensing value received from the at least one sensor module based on the change in the relative location, and output, on the display module, a second graphical element corresponding to the corrected second direction information.

19 Claims, 21 Drawing Sheets

(51) Int. Cl.
　　H04N 23/63　　(2023.01)
　　H04N 23/695　　(2023.01)
(52) U.S. Cl.
　　CPC ..... H04N 23/695 (2023.01); *G09G 2320/028* (2013.01); *G09G 2320/068* (2013.01); *G09G 2340/0492* (2013.01)

(56) References Cited

U.S. PATENT DOCUMENTS

| | | | |
|---|---|---|---|
| 2017/0213393 | A1 | 7/2017 | Fedosov et al. |
| 2022/0050652 | A1* | 2/2022 | Heo .................. G09G 3/3406 |

FOREIGN PATENT DOCUMENTS

| | | |
|---|---|---|
| KR | 10-0533106 | 11/2005 |
| KR | 10-2017-0089664 A | 8/2017 |
| KR | 10-1810935 | 12/2017 |
| KR | 10-2019-0079241 | 7/2019 |
| KR | 10-2019-0141518 | 12/2019 |
| KR | 10-2065411 B1 | 1/2020 |
| KR | 10-2070244 B1 | 1/2020 |
| KR | 10-2020-0017068 | 2/2020 |
| KR | 10-2020-0126232 | 11/2020 |
| KR | 10-2258022 | 5/2021 |
| KR | 10-2021-0081576 A | 7/2021 |
| KR | 10-2021-0100170 | 8/2021 |
| KR | 10-2021-0113805 | 9/2021 |
| KR | 10-2021-0146095 | 12/2021 |
| KR | 10-2022-0003863 A | 1/2022 |
| KR | 10-2022-0061805 | 5/2022 |
| KR | 10-2022-0062972 | 5/2022 |
| WO | 2016/045323 | 3/2016 |

OTHER PUBLICATIONS

PCT International Search Report dated Feb. 28, 2023 for PCT Application No. PCT/KR2022/018584.

* cited by examiner

ELECTRONIC DEVICE WITH FLEXIBLE DISPLAY

CROSS-REFERENCE TO RELATED APPLICATIONS

This application is a continuation application of International Application No. PCT/KR2022/018584 designating the United States, filed on Nov. 23, 2022, at the Korean Intellectual Property Receiving Office and claiming priority to Korean Patent Application No. 10-2022-0010753, filed on Jan. 25, 2021, and Korean Patent Application No. 10-2022-0021094, filed on Feb. 17, 2022, at the Korean Intellectual Property Office, the disclosures of which are all hereby incorporated by reference herein in their entireties.

BACKGROUND

1. Field

Certain example embodiments relate to an electronic device with a flexible display.

2. Description of Related Art

With the development of Internet of Things (IoT), an increasing number of people are using IoT devices and smart tags. Mobile terminals may display the location of an object based on an azimuth angle calculated by short-range positioning. Short-range positioning may be calculated by analyzing a captured image using at least one among ultra-wideband (UWB) communication, a Bluetooth (BT) communication-based real time location system (RTLS), a time of flight (ToF) sensor, an acceleration sensor, a geomagnetic sensor, and/or a camera.

In a mobile terminal having a flexible display of which a size of a screen is changeable, a display reference point may be moved or a direction indicating the location of an object may be changed by the change in the size of the screen. Displaying the location of an object based on a previously calculated azimuth angle may cause a display error.

SUMMARY

Without correction for a change in a size of a display, displaying a location of an object on a screen may cause an error. According to an example embodiment, when displaying a location of an object on a screen, an electronic device may perform location display correction of the object according to a size change of a display and/or a movement of a sensor module.

According to an example embodiment, an electronic device may include at least one sensor module configured to calculate direction information. The electronic device may include a display module configured to change a size of a viewable region viewed from one side. The electronic device may include a display length detection module configured to calculate the size of the viewable region. The electronic device may include a memory configured to store computer-executable instructions. The electronic device may include at least one processor, comprising processing circuitry, configured to execute the instructions by accessing the memory. The at least one processor, upon execution of the instructions, may be configured to output, on the display module, a first graphical element corresponding to first direction information calculated based on a first sensing value received from the at least one sensor module. The instructions may be configured to monitor a change in a relative location between the first graphical element being currently output and the at least one sensor module in response to an occurrence of an event to change the size of the viewable region. The instructions may be configured to correct, based on the change in the relative location, second direction information calculated based on a second sensing value received from the at least one sensor module in response to a determination that the relative location is changed. The instructions may be configured to output, on the display module, a second graphical element corresponding to the corrected second direction information.

A method implemented by a processor may include outputting, on a display module, a first graphical element corresponding to first direction information calculated based on a first sensing value received from at least one sensor module according to an example embodiment. The method may include monitoring a change in a relative location between the first graphical element being currently output and the at least one sensor module in response to an occurrence of an event to change a size of a viewable region of the display module. The method may include correcting, based on the change in the relative location, second direction information calculated based on a second sensing value received from the at least one sensor module in response to a determination that the relative location is changed. The method may include outputting a second graphical element corresponding to the corrected second direction information on the display module.

According to an example embodiment, an electronic device may accurately display and transmit information on a location of an object in an application screen to a user without an error even when a size of a viewable region of a display module is changed.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
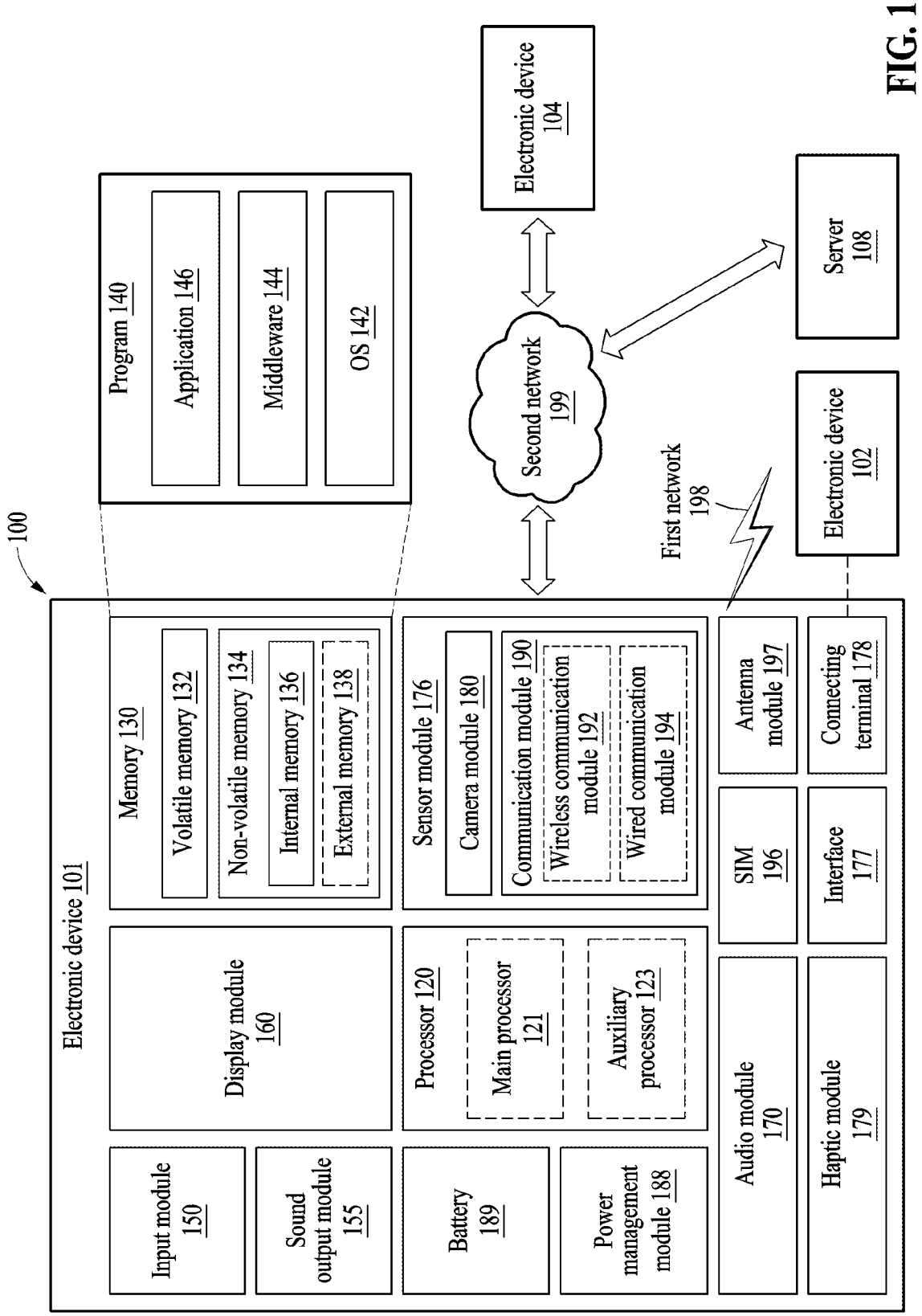
FIG. 1 is a block diagram illustrating an electronic device in a network environment according to an example embodiment.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to an example embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120 comprising processing circuitry, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160). In an example embodiment, the sensor module 176 may include the camera module 180 and the communication module 190.

The processor 120 may execute, for example, software (e.g., a program 140) to control at least one other component (e.g., a hardware or software component) of the electronic device 101 connected, directly or indirectly, to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. Each processor herein comprises processing circuitry.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated through machine learning. Such learning may be performed by, for example, the electronic device 101 in which AI is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but examples of which are not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an example embodiment, the display module 160 may include a touch sensor adapted to sense a touch, or a pressure sensor adapted to measure the intensity of a force incurred by the touch. The display module 160 may change a size of a viewable region viewed from one side (e.g., a side where a user is located) and may also be referred to as a flexible display. A rollable display is described as an example of the display module 160 capable of changing a size of a viewable region, as illustrated in FIGS. 2A through 3B below.

The electronic device 101 may further include a display length detection module (e.g., a display length detection module 430*a*, 430*b*, 430*c*, 430*f* of FIGS. 4A through 4F). The display length detection module may be a module for calculating a size of the viewable region of the display module 160. The display length detection module may obtain (or receive) a sensing value corresponding to an additional size compared to a default size of the viewable region. The default size may be a size of the viewable region in a closed state, which is described later in FIGS. 2A through 3B. The additional size may be a size of an added region compared to the default size according to expansion of the viewable region. The size of the viewable region may be represented by a length along one axis (e.g., an x-axis), and the additional size (e.g., an added length) compared to the default size (e.g., a default length) may be represented by an extended length. The display length detection module may obtain (or receive) a sensing value corresponding to the above-described additional size based on at least one among capacitance change sensing, inductance change sensing, magnetic flux change sensing, touch point change sensing, resistance change sensing, and distance change sensing according to the change in the size of the viewable region. The display length detection module may be operatively connected to the processor 120 to transmit the obtained (or received) sensing value to the processor 120. An example of the display length detection module is described with reference to FIGS. 4A through 4F below.

The audio module 170 may convert a sound into an electrical signal or vice versa. According to an example embodiment, the audio module 170 may obtain the sound via the input module 150, or output the sound via the sound output module 155 or an external electronic device (e.g., the electronic device 102 such as a speaker or headphones) directly or wirelessly connected to the electronic device 101.

At least one sensor module 176 may include a sensor for calculating direction information. The direction information may be information indicating a direction from the electronic device 101 toward an external location and include, for example, at least one among an azimuth angle indicating a true north direction and a direction indicating an object recognized using the at least one sensor module. The object may include at least one of objects identified from an image captured by an external device (e.g., an Internet of Things (IoT) server, a base station, and an IoT device) that establishes communication with the electronic device 101 and a vision sensor (e.g., a camera module). The external location may be a physical location of the above-described external device and/or object. In the present disclosure, for ease of description, the direction information is described as an angle between one axis (e.g., the x-axis) of the electronic device and a direction from the display reference point toward the external location, but examples are not limited thereto. A representation scheme of direction information, a unit, and an axis serving as a reference may vary depending on a design.

For example, the at least one sensor module 176 may include at least one among a geomagnetic sensor, the communication module 190 that establishes communication with the external device, a positioning module, a distance sensor for detecting a distance to an object, and a vision sensor for detecting an object. The geomagnetic sensor may be a sensor for detecting intensity of Earth's magnetic field, and a sensing value of the geomagnetic sensor may be used to calculate direction information indicating true north and/or magnetic north. For example, the communication module 190 may establish communication with at least one of an external object device, an external server, and an external base station. The communication module 190 may perform Bluetooth communication or ultra-wideband (UWB) communication with the external object device located nearby. The positioning module may be a sensor for positioning the electronic device 101 and may receive, for example, a global navigation satellite system (GNSS) signal (e.g., a global positioning system (GPS) signal) from a satellite. A physical location (e.g., coordinates) of the electronic device 101 may be obtained based on a sensing value of the positioning module. The distance sensor may include, for example, at least one among a time of flight (ToF) sensor, a light detection and ranging (LIDAR) sensor, and a radio detection and ranging (RADAR) sensor. The vision sensor may be a sensor for capturing a vision image and may include, for example, at least one among an infrared ray (IR) sensor and the camera module 180. The camera module 180 may capture a still image and moving images. According to an example embodiment, the camera module 180 may include at least one among one or more of lenses, image sensors, image signal processors (ISPs), and flashes. However, examples are not limited thereto, and the sensor module 176 may include a sensor for sensing a true north direction and/or a sensor for sensing a direction toward an object. Direction information displayed on a screen (e.g., an application screen) of the viewable region of the display module 160 may be calculated through sensing by one or a combination of two or more of sensors.

The sensor module 176 may sense an operational state (e.g., power or temperature) of the electronic device 101 or an environmental state (e.g., a state of a user) external to the electronic device 101, and generate an electrical signal or a data value corresponding to the sensed state. According to an example embodiment, the sensor module 176 may include, for example, a gesture sensor, a gyro sensor, an atmospheric pressure sensor, a magnetic sensor, an acceleration sensor, a gyro sensor, a grip sensor, a proximity sensor, a color sensor, an IR sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a GNSS communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to an example embodiment, the antenna module 197 may form a mmWave antenna module. According to an example embodiment, the mmWave antenna module may include a PCB, an RFIC disposed on a first surface (e.g., the bottom surface) of the PCB or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
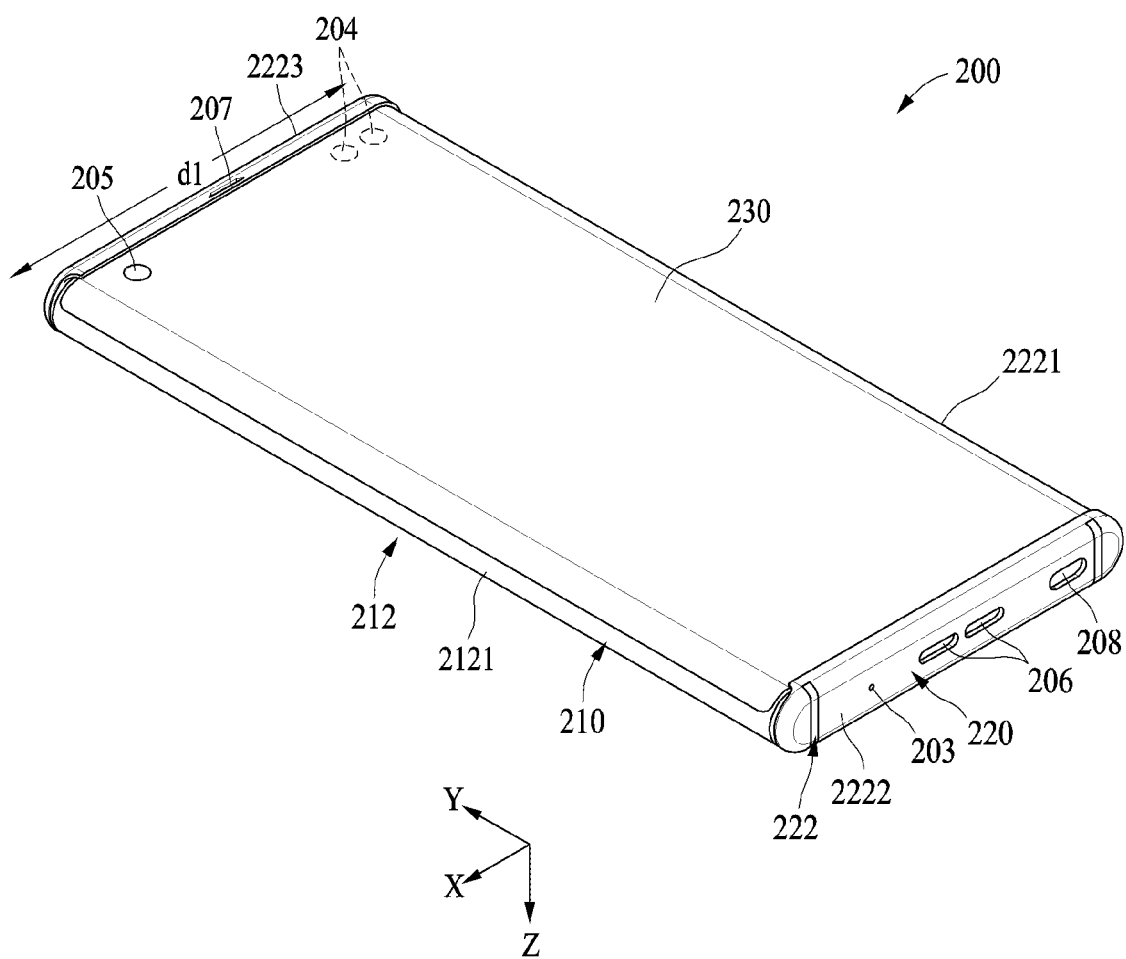
FIGS. 2A and 2B are front perspective views of an electronic device in a closed state and an open state according to an example embodiment.
Figure 2B:
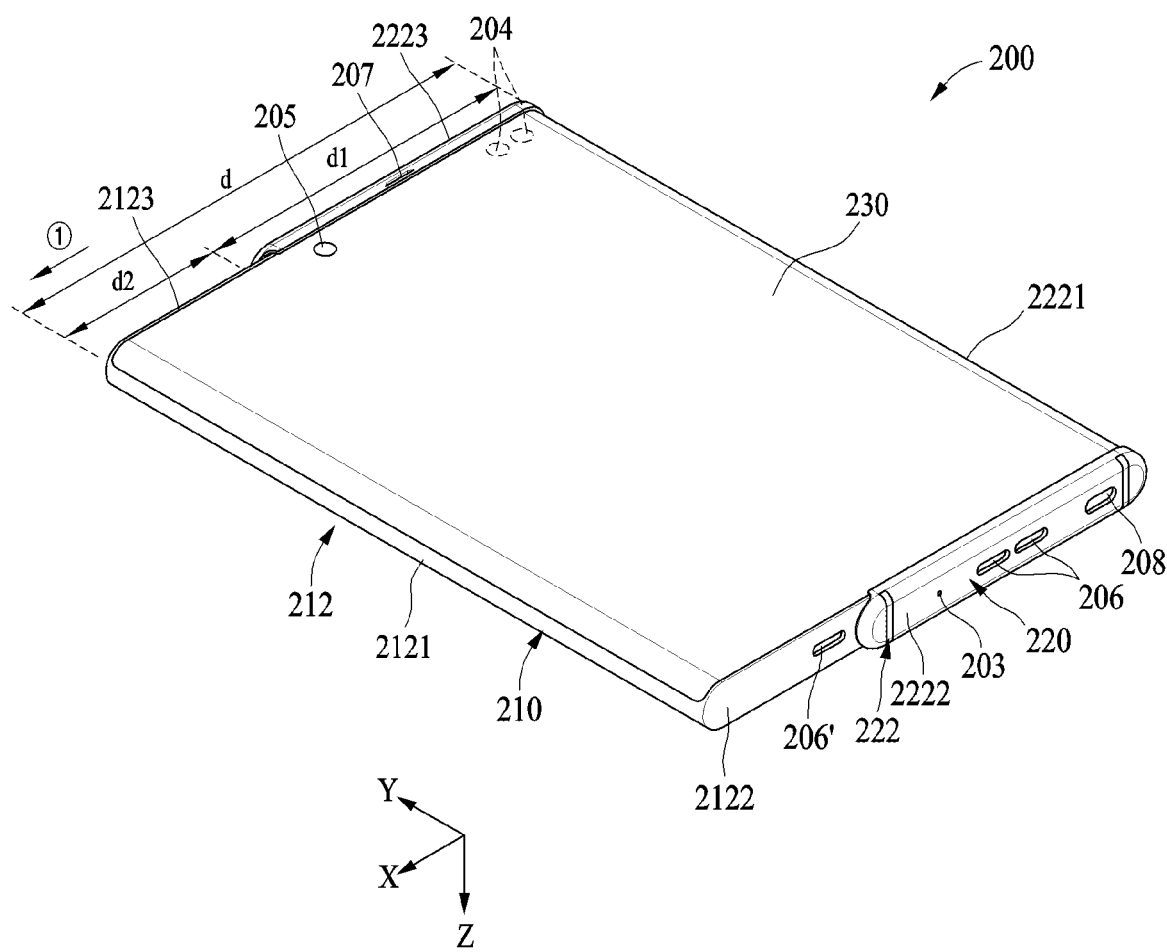
Figure 3A:
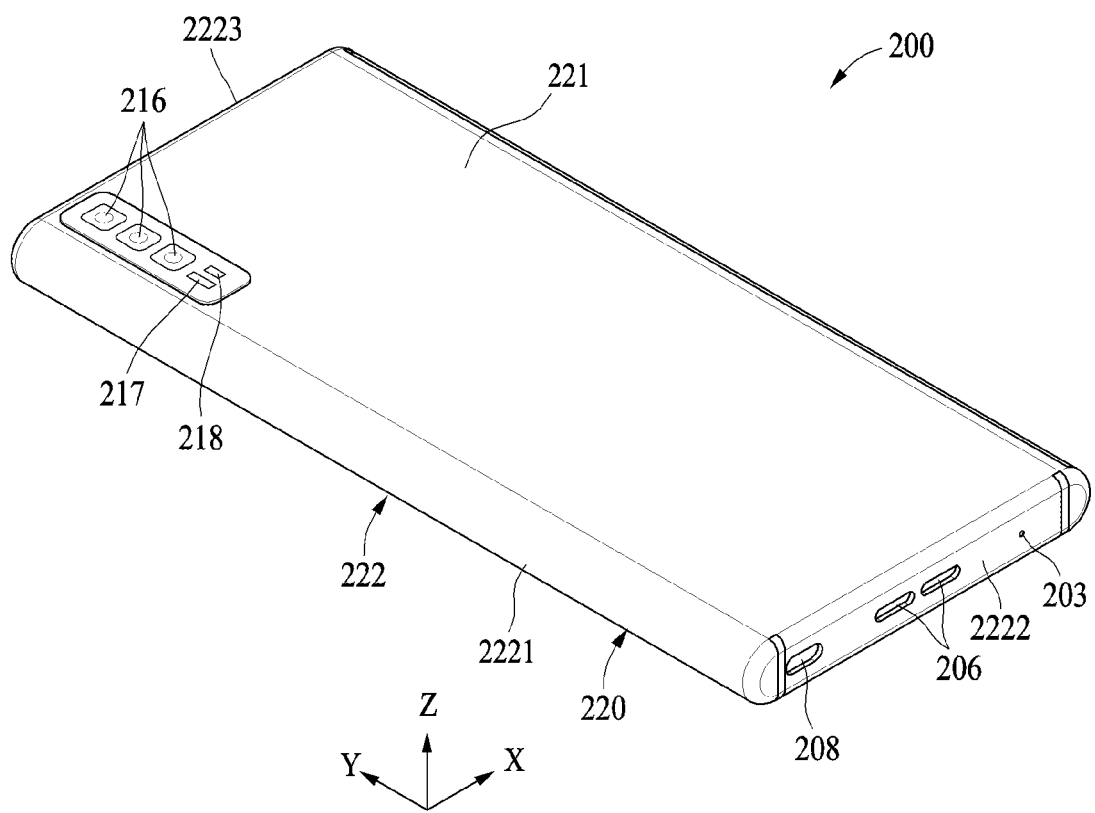
FIGS. 3A and 3B are rear perspective views of an electronic device in a closed state and an open state according to an example embodiment.
Figure 3B:
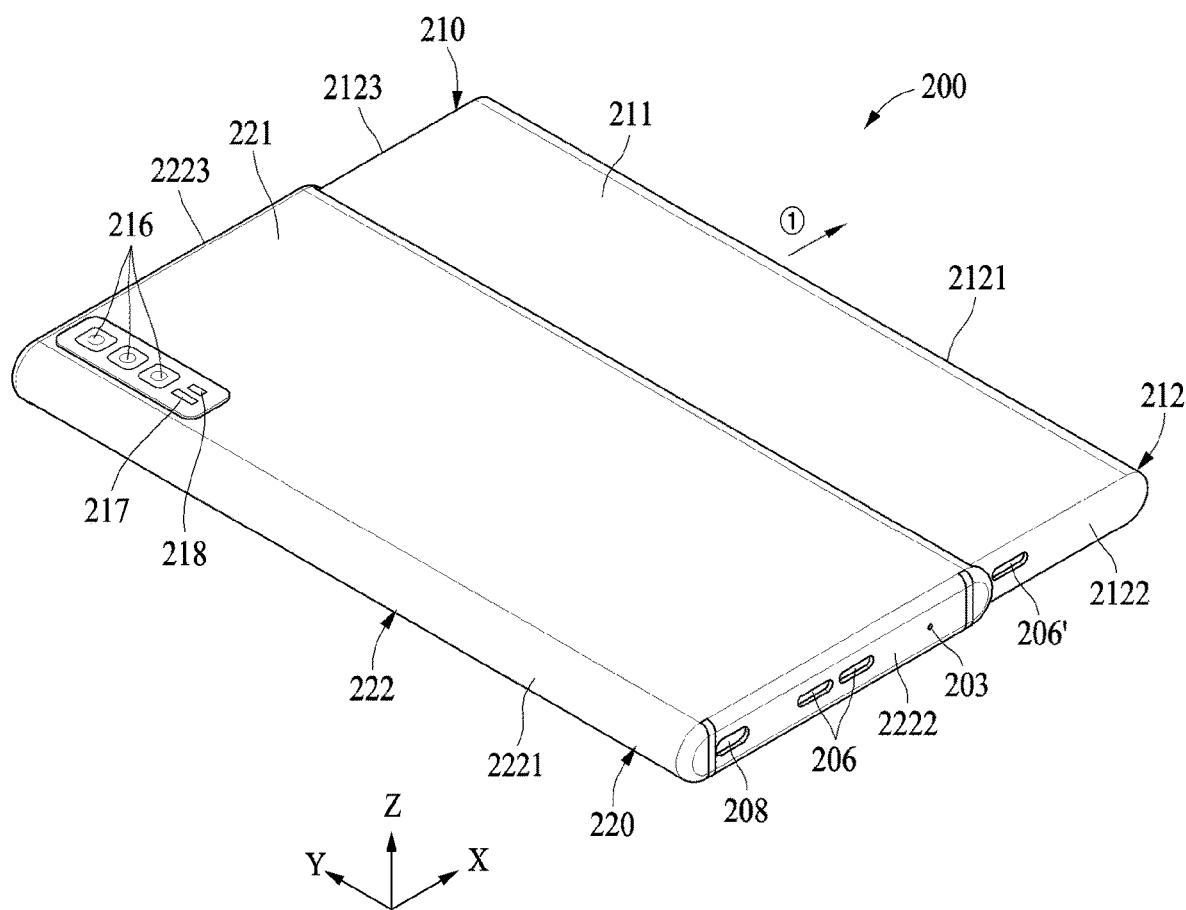

FIGS. 2A and 2B are front perspective views of an electronic device 200 in a closed state and an open state according to an example embodiment. FIGS. 3A and 3B are rear perspective views of the electronic device 200 in a closed state and an open state according to an example embodiment.

The electronic device 200 of FIG. 2A may be at least partially similar to the electronic device 101 of FIG. 1, or may further include other embodiments of the electronic device.

Referring to FIGS. 2A to 3B, the electronic device 200 may include a first housing 210, and a second housing 220 that is at least partially movably coupled to the first housing 210. According to an example embodiment, the first housing 210 may include a first plate 211, and a first side frame 212 that extends in a substantially vertical direction (e.g., a z-axis direction) along an edge of the first plate 211. According to an example embodiment, the first side frame 212 may include a first side surface 2121, a second side surface 2122 extending from one end of the first side surface 2121, and a third side surface 2123 extending from the other end of the first side surface 2121. According to an example embodiment, the first housing 210 may include a first space that is at least partially closed from the outside by the first plate 211 and the first side frame 212.

According to an example embodiment, the second housing 220 may include a second plate 221, and a second side frame 222 that extends in a substantially vertical direction (e.g., the z-axis direction) along an edge of the second plate 221. According to an example embodiment, the second side frame 222 may include a fourth side surface 2221 facing away from the first side surface 2121, a fifth side surface 2222 extending from one end of the fourth side surface 2221 and at least partially coupled to the second side surface 2122, and a sixth side surface 2223 extending from the other end of the fourth side surface 2221 and at least partially coupled to the third side surface 2123. In an example embodiment, the fourth side surface 2221 may extend from a structure other than the second plate 221 and may also be coupled to the second plate 221. According to an example embodiment, the second housing 220 may include a second space that is at least partially closed from the outside by the second plate 221 and the second side frame 222. According to an example embodiment, the first plate 211 and the second plate 221 may be disposed to at least partially form a rear surface of the electronic device 200. For example, the first plate 211, the second plate 221, the first side frame 212, and the second side frame 222 may be formed of, for example, a polymer, coated or colored glass, ceramic, metal (e.g., aluminum, stainless steel (STS), or magnesium), or a combination of two or more of the above-mentioned materials.

According to an example embodiment, the electronic device 200 may include a flexible display 230 disposed to be supported by the first housing 210 and the second housing 220. According to an example embodiment, the flexible display 230 may include a flat portion supported by the second housing 220, and a bendable portion extending from the flat portion and supported by the first housing 210. According to an example embodiment, the bendable portion of the flexible display 230 may be disposed in the first space of the first housing 210 such that the bendable portion is not exposed to the outside when the electronic device 200 is closed and may be exposed to the outside, extending from the flat portion while being supported by the first housing 210, when the electronic device 200 is open. Accordingly, the electronic device 200 may be a rollable electronic device in which a display screen (e.g., a viewable region viewed from one side) of the flexible display 230 is expanded in response to an open operation according to a movement of the first housing 210 away from the second housing 220.

According to an example embodiment, in the electronic device 200, the first housing 210 may be at least partially inserted into the second space of the second housing 220, and may be coupled to be movable in direction ①. For example, in the closed state, the electronic device 200 may be maintained in a state in which the first housing 210 and the second housing 220 are coupled such that a distance between the first side surface 2121 and the fourth side surface 2221 is a first distance d1. According to an example embodiment, in the open state, the electronic device 200 may be maintained in a state in which the first housing 210 protrudes from the second housing 220 to have a second interval distance d in which the first side surface 2121 protrudes from the fourth side surface 2221 by a predetermined distance d2. According to an example embodiment, in the open state, the flexible display 230 may be supported by the first housing 210 and/or the second housing 220 such that both ends thereof have curved edges.

According to an example embodiment, the electronic device 200 may automatically transition between the open state and the closed state by a driving unit disposed in the first space and/or the second space. For example, a processor (e.g., the processor 120 of FIG. 1) of the electronic device 200 may be configured to control an operation of the first housing 210 using the driving unit when an event related to a transition between the open state and the closed state of the electronic device 200 is detected. The driving unit that changes the size of the viewable region of the display module may include a motor, but examples are not limited thereto, and may include a driving module that provides electrical and/or mechanical driving force that causes a change in the size of the viewable region. In an example embodiment, the first housing 210 may manually protrude from the second housing 220 through a user's manipulation (e.g., physical force). In this example, the first housing 210 may protrude by a protrusion amount desired by the user, and thus, a screen of the flexible display 230 may vary allowing a display area of the screen to vary in size. For example, the flexible display 230 may have a viewable region of a default size in the closed state and have a viewable region of a maximum or large size in the open state. Expansion and/or reduction of the flexible display 230 may be stopped at a point where the viewable region is a predetermined size between the default size and the maximum or large size. Accordingly, the processor (e.g., the processor 120 of FIG. 1) of the electronic device 200 may display an object (e.g., a graphical element representing an external object) in various ways corresponding to a display area corresponding to a predetermined protrusion amount of the first housing 210, and may control to execute an application program. FIGS. 2A through 3B illustrate examples in which the flexible display 230 expands in one direction when an event related to the transition between the open state and the closed state is detected, but examples are not limited thereto, and the flexible display 230 may be expanded in another direction or in both directions.

According to an example embodiment, the electronic device 200 may include at least one of an input device 203, sound output devices 206 and 207, sensor modules 204 and 217, camera modules 205 and 216, a connector port 208, a key input device (not shown), or an indicator (not shown). In an example embodiment, at least one of the above-described components of the electronic device 200 may be omitted, or the electronic device 200 may further include other components.

According to an example embodiment, the input device 203 may include a microphone 203. In some embodiments, the input device 203 may include a plurality of microphones 203 arranged to sense a direction of sound. The sound output devices 206 and 207 may include speakers 206 and 207. The speakers 206 and 207 may include an external speaker 206 and a phone call receiver 207. In an example embodiment, in the closed state, when an external speaker 206' is disposed in the first housing 210, sound may be output through a speaker hole 206 formed in the second housing 220. According to an example embodiment, the microphone 203 or the connector port 208 may be formed to have substantially the same configuration. In an example embodiment, the sound output devices 206 and 207 may include a speaker (e.g., a piezo speaker) that operates without a separate speaker hole 206.

According to an example embodiment, the sensor modules 204 and 217 may generate an electrical signal or a data value corresponding to an internal operating state of the electronic device 200 or an external environmental state. The sensor modules 204 and 217 may include, for example, a first sensor module 204 (e.g., a proximity sensor or an illuminance sensor) disposed on a front surface of the second housing 220, and/or a second sensor module 217 (e.g., a heart rate monitor (HRM) sensor) disposed on a rear surface of the second housing 220. According to an example embodiment, the first sensor module 204 may be disposed below the flexible display 230 in the second housing 220. According to an example embodiment, the first sensor module 204 may further include at least one of a proximity sensor, an illuminance sensor, a ToF sensor, an ultrasonic sensor, a fingerprint recognition sensor, a gesture sensor, a gyro sensor, an atmospheric pressure sensor, a magnetic sensor, an acceleration sensor, a grip sensor, a color sensor, an IR sensor, a biometric sensor, a temperature sensor, or a humidity sensor.

According to an example embodiment, the camera devices 205 and 216 may include a first camera device 205 disposed on the front surface of the second housing 220 of the electronic device 200, and a second camera device 216 disposed on the rear surface of the second housing 220. According to an example embodiment, the electronic device 200 may include a flash 218 located near the second camera device 216. According to an example embodiment, the camera devices 205 and 216 may include one or more lens, an image sensor, and/or an ISP. According to an example embodiment, the first camera device 205 may be disposed under the flexible display 230, and may be configured to capture an object through a portion of an active area of the flexible display 230. According to an example embodiment, the flash 218 may include, for example, a light-emitting diode (LED) or a xenon lamp. In some embodiments, two or more lenses (e.g., a wide-angle lens and a telephoto lens) and image sensors may be disposed on one surface of the electronic device 200.

According to an example embodiment, the electronic device 200 may include at least one antenna (not shown). According to an example embodiment, the at least one antenna may wirelessly communicate with an external electronic device (e.g., the electronic device 104 of FIG. 1), or may wirelessly transmit and receive power required for charging. According to an example embodiment, the antenna may include a legacy antenna, a mmWave antenna, a near field communication (NFC) antenna, a wireless charging antenna, and/or a magnetic secure transmission (MST) antenna. According to an example embodiment, an antenna structure may be formed through at least a portion of the first side frame 212 and/or the second side frame 222, which are formed of metal.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. Terms such as "$1^{st}$", "$2^{nd}$", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via at least a third element.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC). Thus, each "module" herein may comprise circuitry.

Embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

FIGS. 4A through 4F are diagrams illustrating a display length detection module according to an example embodiment.

As described above with reference to FIG. 1, the display length detection module may obtain a sensing value corresponding to the additional size based on at least one among capacitance change sensing, inductance change sensing, magnetic flux change sensing, touch point change sensing, resistance change sensing, and distance change sensing according to the change in the size of the viewable region.

Figure 4A:
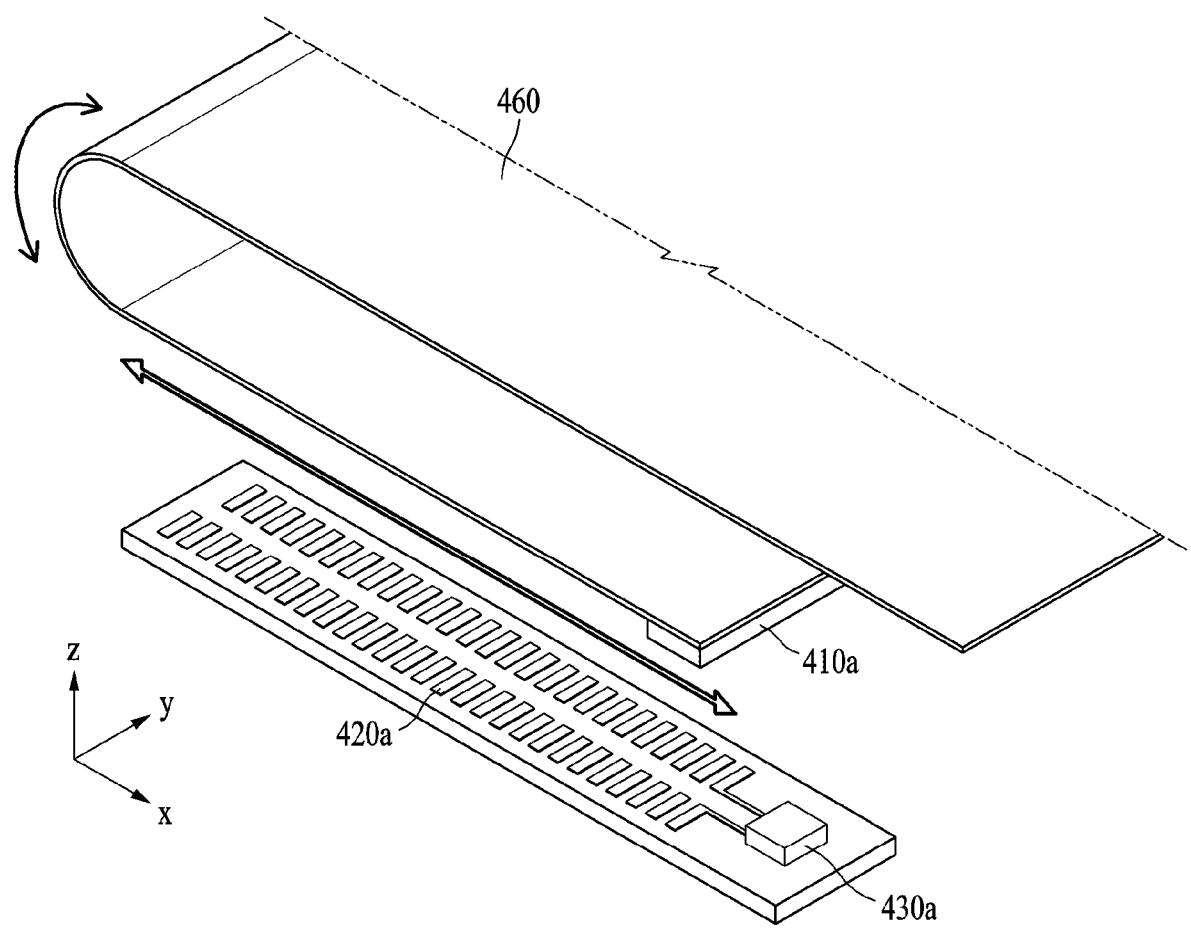
FIGS. 4A through 4F are diagrams illustrating a display length detection module according to an example embodiment.

As illustrated in FIG. 4A, a metal 410a may be connected, directly or indirectly, to one end of a display module 460 (e.g., the display module 160 of FIG. 1). An internal substrate of an electronic device (e.g., the electronic device 101 of FIG. 1) may include a plurality of metals 420a spaced apart from each other along one axis (e.g., an x-axis). Capacitive coupling may be formed between the metal 410a connected to the display module 460 and the metals 420a disposed on the substrate. The metal 410a may be moved along the one axis (e.g., the x-axis) in response to a change in a size of a viewable region in the display module 460. As described above, since the metals 420a are disposed to be spaced apart from each other on the substrate, capacitance according to the capacitive coupling between the metal 410a and the metals 420a may vary depending on the change in the size of the viewable region. The display length detection module 430a may sense a capacitance value obtained by the capacitive coupling formed between the above-described metal 410a and metals 420a. The capacitance value may be interpreted as a value corresponding to a length of the one axis (e.g., a length of the x-axis) of a portion added to a default size.

Figure 4B:
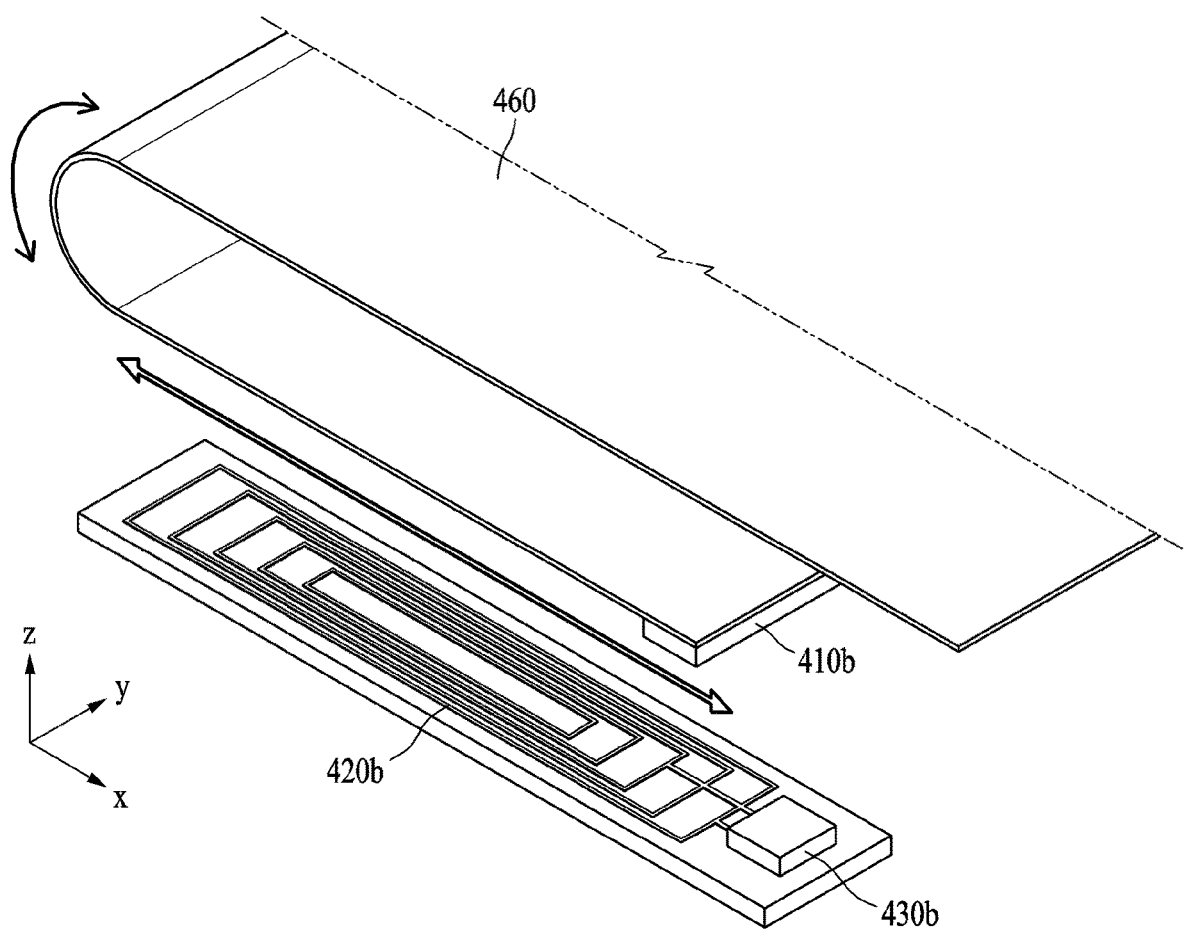

As illustrated in FIG. 4B, a metal 410b may be connected to the one end of the display module 460. A coil 420b elongated along the one axis (e.g., the x-axis) may be disposed on the internal substrate. Inductive coupling between the metal 410b connected, directly or indirectly, to the display module 460 and the coil 420b disposed on the substrate may be formed. The metal 410b may be moved along the one axis (e.g., the x-axis) in response to the change in the size of the viewable region in the display module 460. A display length detection module 430b may sense an inductance value obtained by the inductive coupling formed between the above-described metal 410b and coil 420b. The inductance value may be interpreted as a value corresponding to the length of the one axis (e.g., the length of the x-axis) of the portion added to the default size. However, the examples are not limited thereto, and the display length detection module 430b may recognize a magnetic flux change of the magnetized metal 410b or sense a rotation change of magnetic flux in a hinge of the electronic device.

Figure 4C:
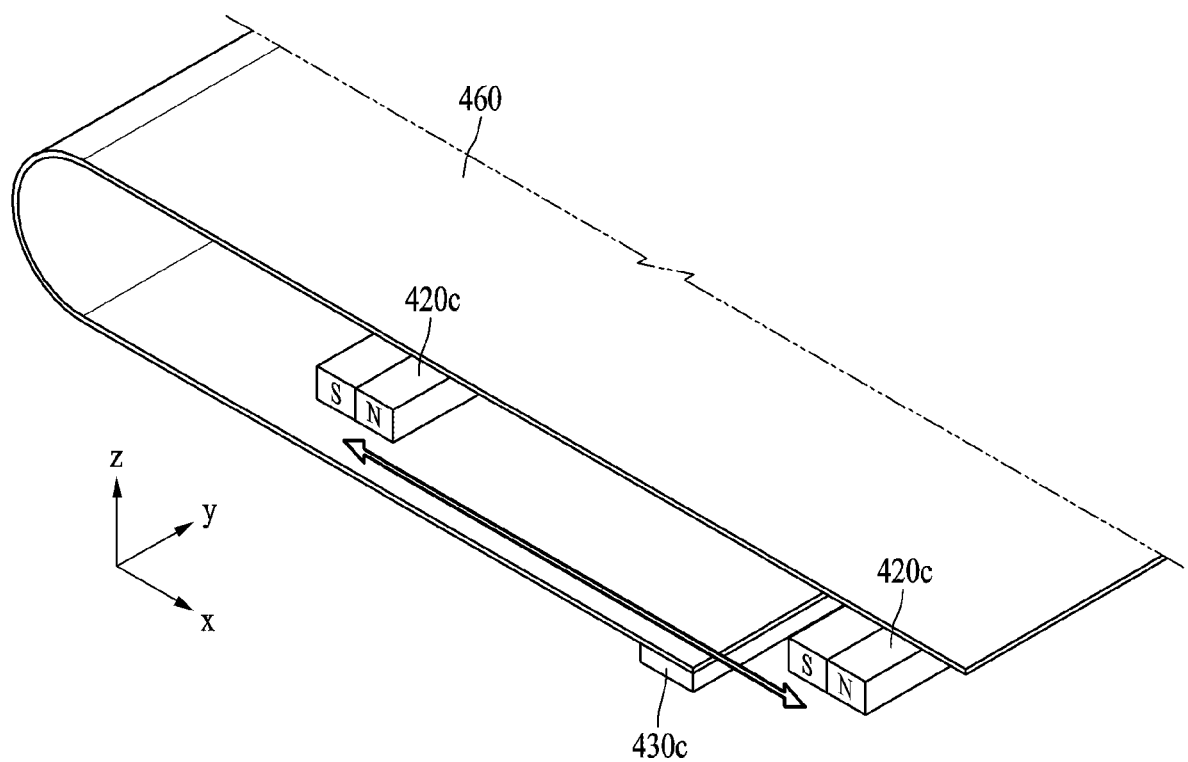

As illustrated in FIG. 4C, a display length detection module 430c may be connected, directly or indirectly, to the one end of the display module 460. The display length detection module 430c may be a hall sensor. One or more of magnets 420c may be disposed on the internal substrate of the electronic device. According to the change in the size of the viewable region, a distance between the display length detection module 430c and the magnets 420c may vary, and magnetic flux sensed by the display length detection module 430c may vary. A magnetic flux value and/or a magnetic flux pattern sensed by the display length detection module 430c may be interpreted as a value corresponding to the length of the one axis (e.g., the length of the x-axis) of the portion added to the default size in the display module 460.

Figure 4D:
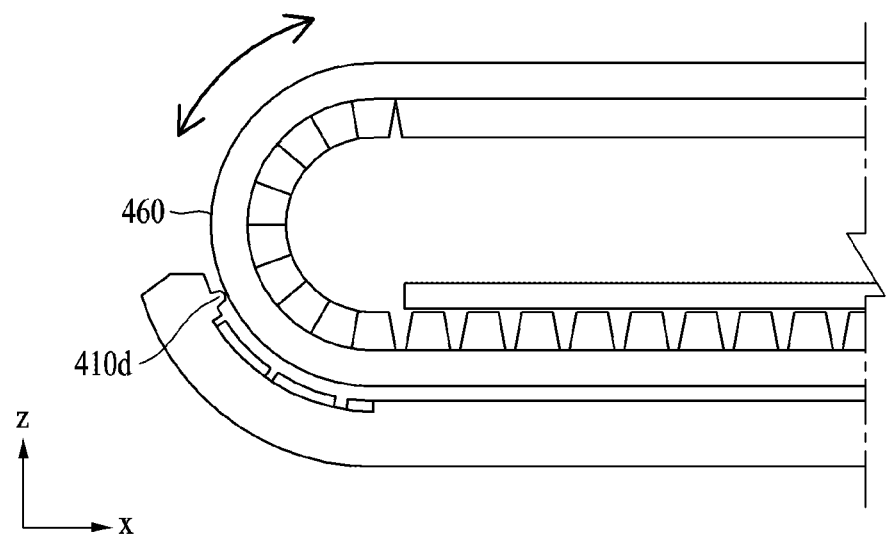

As illustrated in FIG. 4D, a housing of the electronic device may include a conductor 410d disposed to be in contact with a touch screen panel of the display module 460. As an example, FIG. 4D illustrates that the conductor 410d contacts a curved portion of a display panel, but examples are not limited thereto. In response to the change in the size of the viewable region of the display module 460, a contact location between the conductor 410d and the touch screen panel may be changed. The display length detection module may sense contact coordinates between the conductor 410d and the touch screen panel as a sensing value.

Figure 4E:
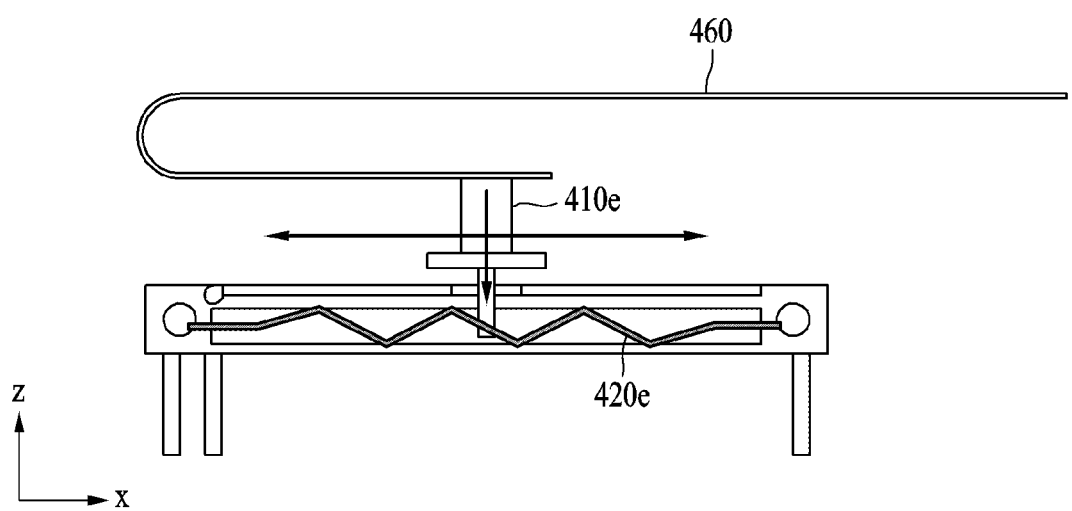

As illustrated in FIG. 4E, a swiper 410e connected, directly or indirectly, to a resistance strip 420e may be connected to one end of the display module 460. The resistance strip 420e may be elongated along the one axis (e.g., the x-axis) on the internal substrate of the electronic device. A resistance value may vary depending on a point at which the swiper 410e and the resistance strip 420e contacts. The display length detection module may sense the resistance value as a sensing value corresponding to an added region of the viewable region.

Figure 4F:
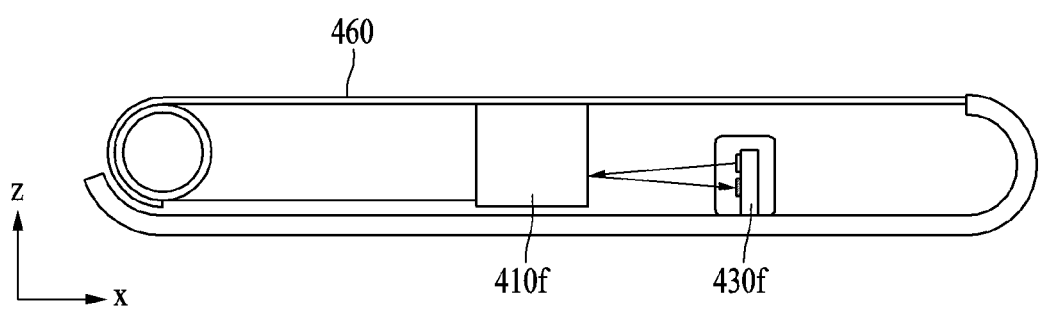

As illustrated in FIG. 4F, an instrument 410*f* may be connected, directly or indirectly, to one end of the display module 460. The instrument 410*f* may reflect a signal transmitted from a display length detection module 430*f*. The instrument 410*f* may be moved along the one axis (e.g., the x-axis) according to the change in the size of the viewable region. The display length detection module 430*f* may obtain a sensing value based on the signal reflected from the instrument 410*f*. For example, the display length detection module 430*f* may transmit a signal (e.g., light) toward the instrument 410*f* through a light source based on ToF and measure a time difference between the transmitted signal and the received signal. The time difference (e.g., a phase difference) between the transmitted signal and the received signal may be converted into a distance. However, examples are not limited thereto, and the display length detection module 430*f* may measure a light amount of reflected light. The light amount may be converted into a distance. A distance between the display length detection module 430*f* and the instrument 410*f* may correspond to the length of the one axis (e.g., the length of the x-axis) of the added region of the viewable region. For example, in response to an increase in the distance between the display length detection module 430*f* and the instrument 410*f*, the length of the one axis of the added region of the viewable region may increase. As another example, in response to a decrease in the distance between the display length detection module 430*f* and the instrument 410*f*, the length of the one axis of the added region of the viewable region may decrease.

Figure 5:
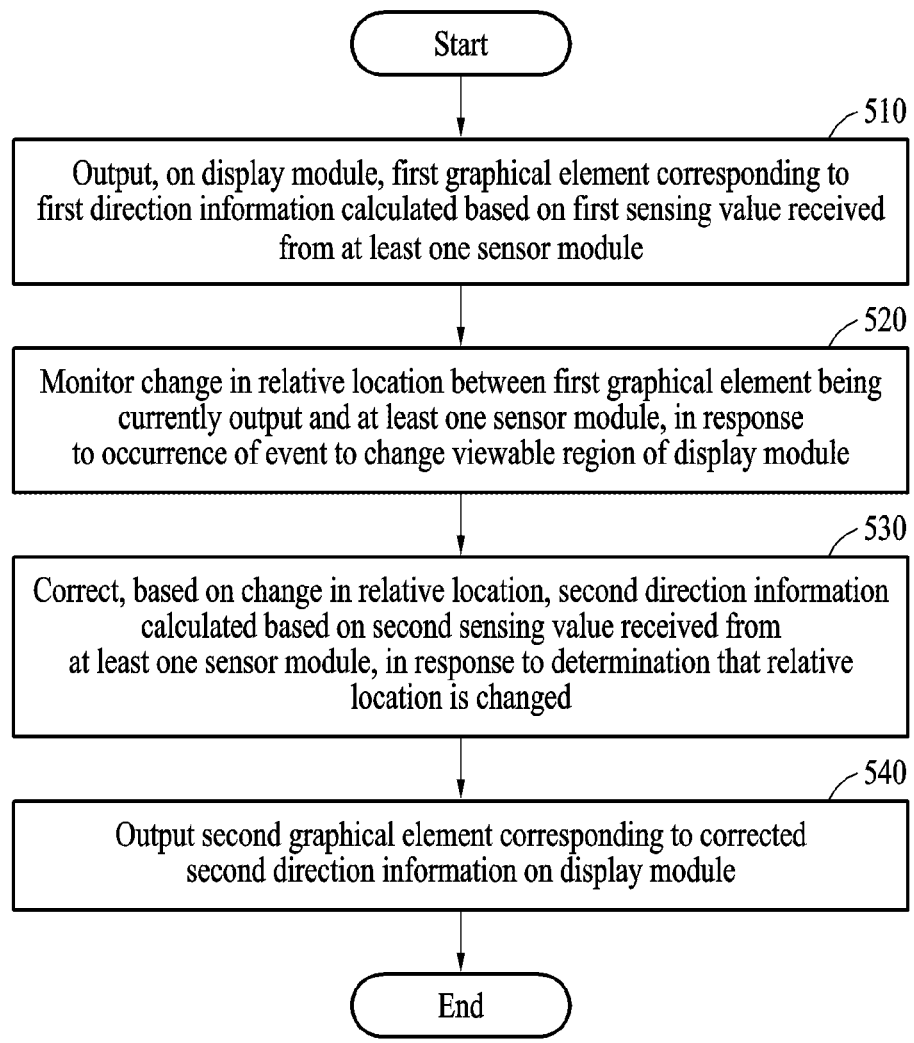
FIG. 5 is a flowchart illustrating an operating method of an electronic device according to an example embodiment.

FIG. 5 is a flowchart illustrating an operating method of an electronic device according to an example embodiment.

In operation 510, an electronic device (e.g., the electronic device 101 and the processor 120 of FIG. 1) may output, on a display module (e.g., the display module 160 of FIG. 1), a first graphical element corresponding to first direction information calculated based on a first sensing value received from at least one sensor module (e.g., the sensor module 176 of FIG. 1). A graphical element may include at least one among a direction graphic representation indicating a direction from the electronic device toward an object or true north and a location graphic representation indicating a location of the object. The direction graphic representation may be output on a display reference point in an application screen of a viewable region. The application screen may be an application screen that provides a graphical element based on direction information. The application screen may occupy the entire viewable region or a part of the viewable region. The display reference point may be a point indicating a location of the electronic device in the application screen. The location graphic representation may be output on a point representing the object in the application screen, which is determined based on the direction information based on the display reference point. The first sensing value may be obtained through sensing before an occurrence of an event to change a size of the viewable region, which is described later.

In operation 520, in response to the occurrence of the event to change the viewable region of the display module, the electronic device may monitor a change in a relative location between the first graphical element being currently output and the at least one sensor module. The event to change the size of the viewable region may include at least one among a user input that causes the change in the size of the viewable region, an event that changes a size of a display received through communication, and/or an event in which the change in the size of the display is triggered by an application. The relative location between the graphical element (e.g., the first graphical element) and the sensor module may be a relative location between a display reference point and a sensing reference point.

For example, the sensing reference point may be a physical location of the sensor module. When the size of the viewable region changes, the sensor module may be moved or fixed in the electronic device according to a structure of the electronic device. The display reference point may be moved by an area change and/or a location change of the application screen based on the change in the size of the viewable region or moved by a change of a point indicating a location of the electronic device in the application screen.

In operation 530, in response to a determination that the relative location is changed, the electronic device may correct, based on the change in the relative location, second direction information calculated based on a second sensing value received from the at least one sensor module. For example, in response to the change of the relative location (e.g., a distance) between the sensing reference point and the display reference point, the electronic device may correct the second direction information. The second sensing value may be a value obtained after a sensing time point of a first sensing value and may be a value sensed after the size change of the viewable region starts. For example, in response to the at least one sensor module being moved by the change in the size of the viewable region, the second sensing value may have a value different from the first sensing value. As another example, in response to a location of the at least one sensor module being fixed, the second sensing value may have a same value as the first sensing value. The electronic device may correct the second direction information by performing at least one of performing re-calculation of the second direction information, calculating and applying a correction value to the second direction information, and applying a previously recorded correction value to the second direction information.

Figure 9:
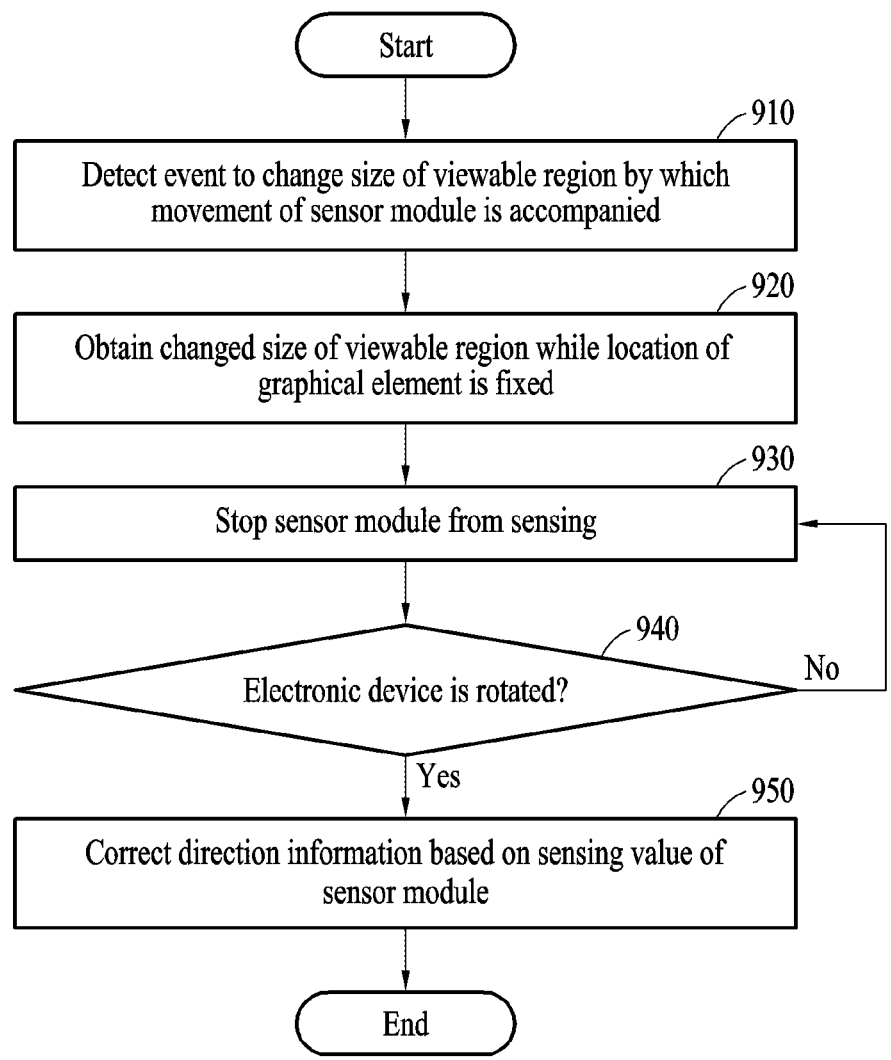
FIGS. 9 through 12 are diagrams illustrating correcting direction information and outputting a graphical element when a sensing reference point moves in an electronic device according to example embodiment(s)
Figure 10:
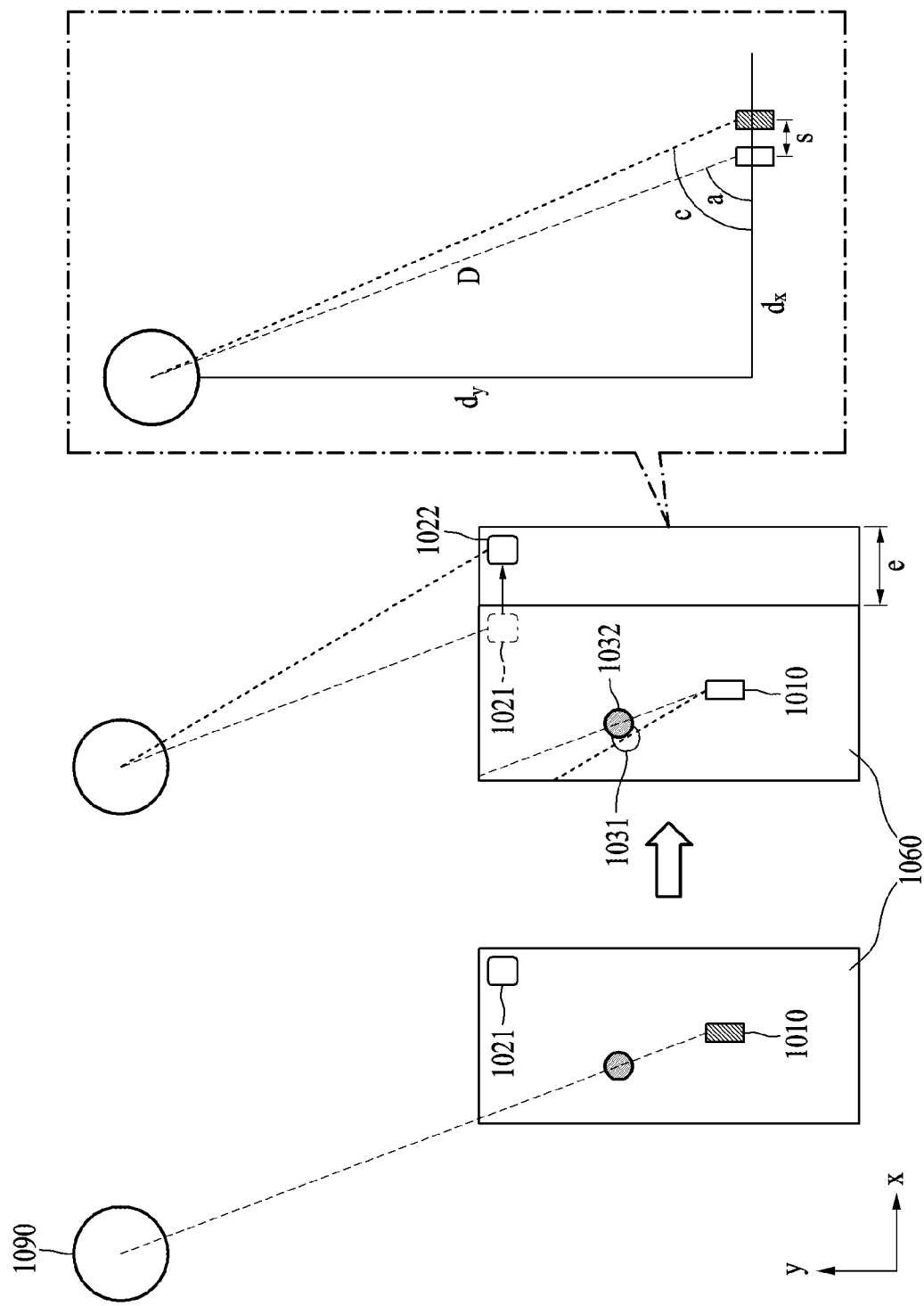

Examples in which a location (e.g., a sensing reference point) of a sensor module is fixed and a location (e.g., a display reference point) of a graphical element in an application screen is moved according to a change in a size of a viewable region are described below with reference to FIGS. 6 through 8 Examples in which a sensing reference point is moved and a display reference point is fixed according to a change in a size of a viewable region are described below with reference to FIGS. 9 through 11. An example in which both of a sensing reference point and a display reference point are moved according to a change in a size of a viewable region is described below with reference to FIG. 12.

In operation 540, the electronic device may output a second graphical element corresponding to the corrected second direction information on the display module. For example, the electronic device may output the second graphical element generated by rotating and/or moving the first graphical element based on the corrected second direction information.

The above descriptions of the operations mainly describe examples in which a relative location is changed. The electronic device may output the second graphical element on the display module using the second direction information calculated based on the second sensing value based on the relative location being maintained. If there is no change in the relative location, the electronic device may output the second graphical element using the second direction information without correction.

According to an example embodiment, the electronic device may execute an application that provides a service (e.g., a nearby object finding service) related to a location of a nearby object. For example, the electronic device may execute an application that outputs a graphical element corresponding to direction information without an image and/or an augmented reality (AR) application that displays a camera image captured by a camera module and a graphical element corresponding to an object together. In the AR application, the graphical element corresponding to the object may be output on a location in an application screen determined based on short-range positioning (e.g., a distance and a direction) between the electronic device and the object. The electronic device may output a direction and/or a distance toward an external location (e.g., a location of an object and/or true north) on a point (e.g., a display reference point) corresponding to a location of the electronic device in the application screen through a graphical element. As another example, the electronic device may output the graphical element on the point in the application screen corresponding to the distance and the direction indicating the location of the object on a camera image.

In response to a change in a location of the electronic device according to the movement of the electronic device itself, the electronic device may measure the direction information and the distance again or perform correction according to an amount of movement. In addition, the electronic device may correct the second direction information sensed in response to the change in the size of the viewable region of the display module based on the change in the relative location between the sensor module and the graphical element. Accordingly, the electronic device may output the graphical element indicating an external location without an error by correcting the second direction information based on the change of the sensing reference point according to a movement of the sensor module and/or the change of the display reference point according to a movement of the graphical element.

Figure 6:
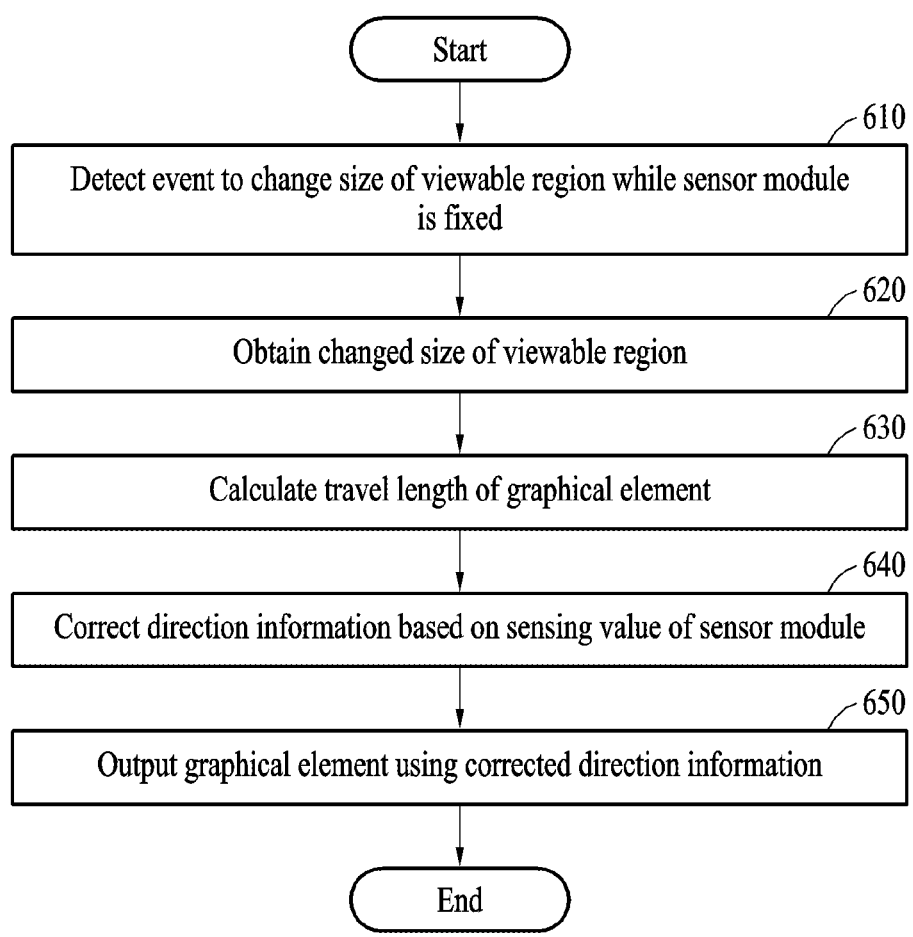
FIGS. 6 through 8 are diagrams illustrating correcting direction information and outputting a graphical element when a display reference point moves while a sensing reference point is fixed in an electronic device according to example embodiment(s)
Figure 7:
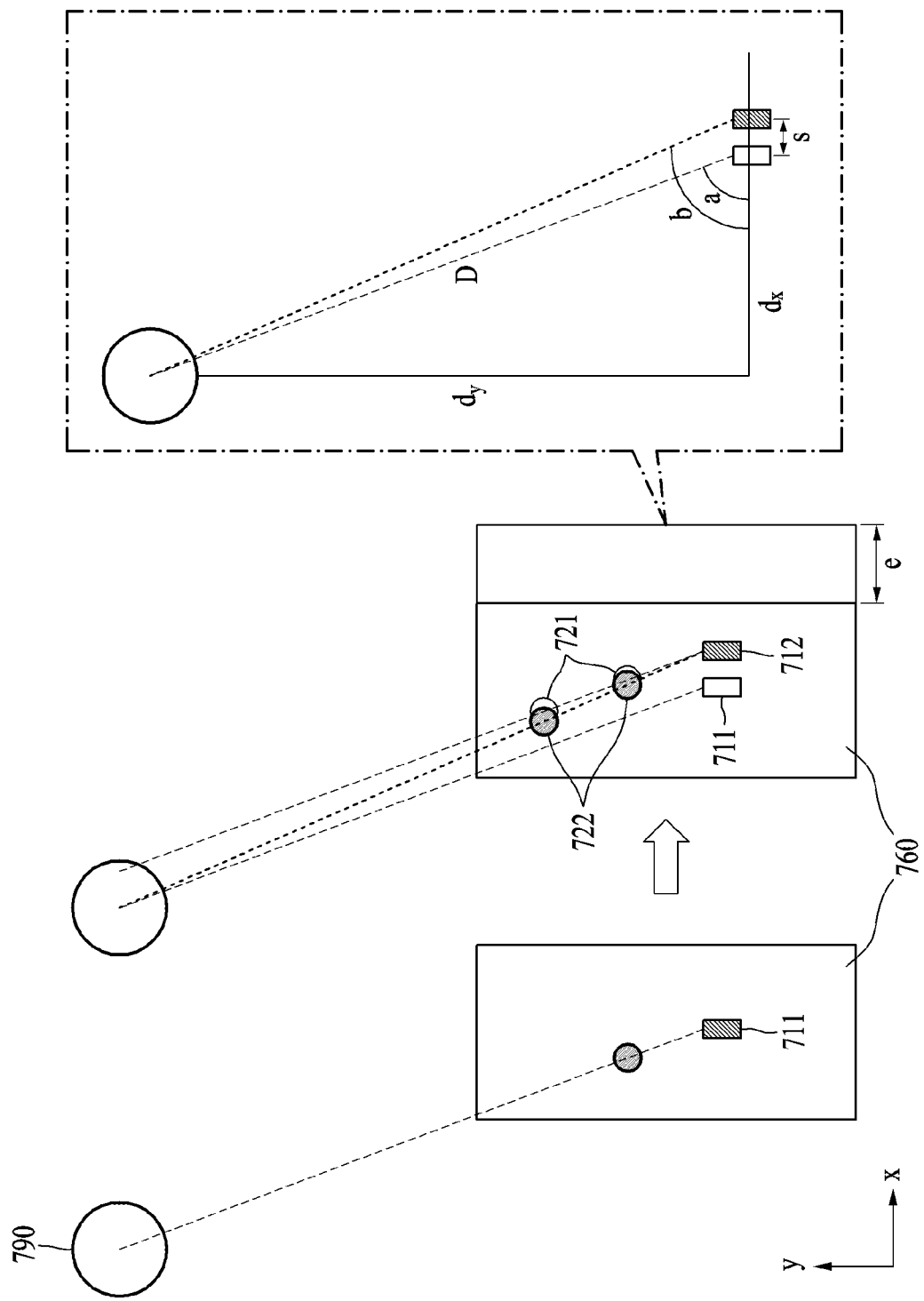
Figure 8:
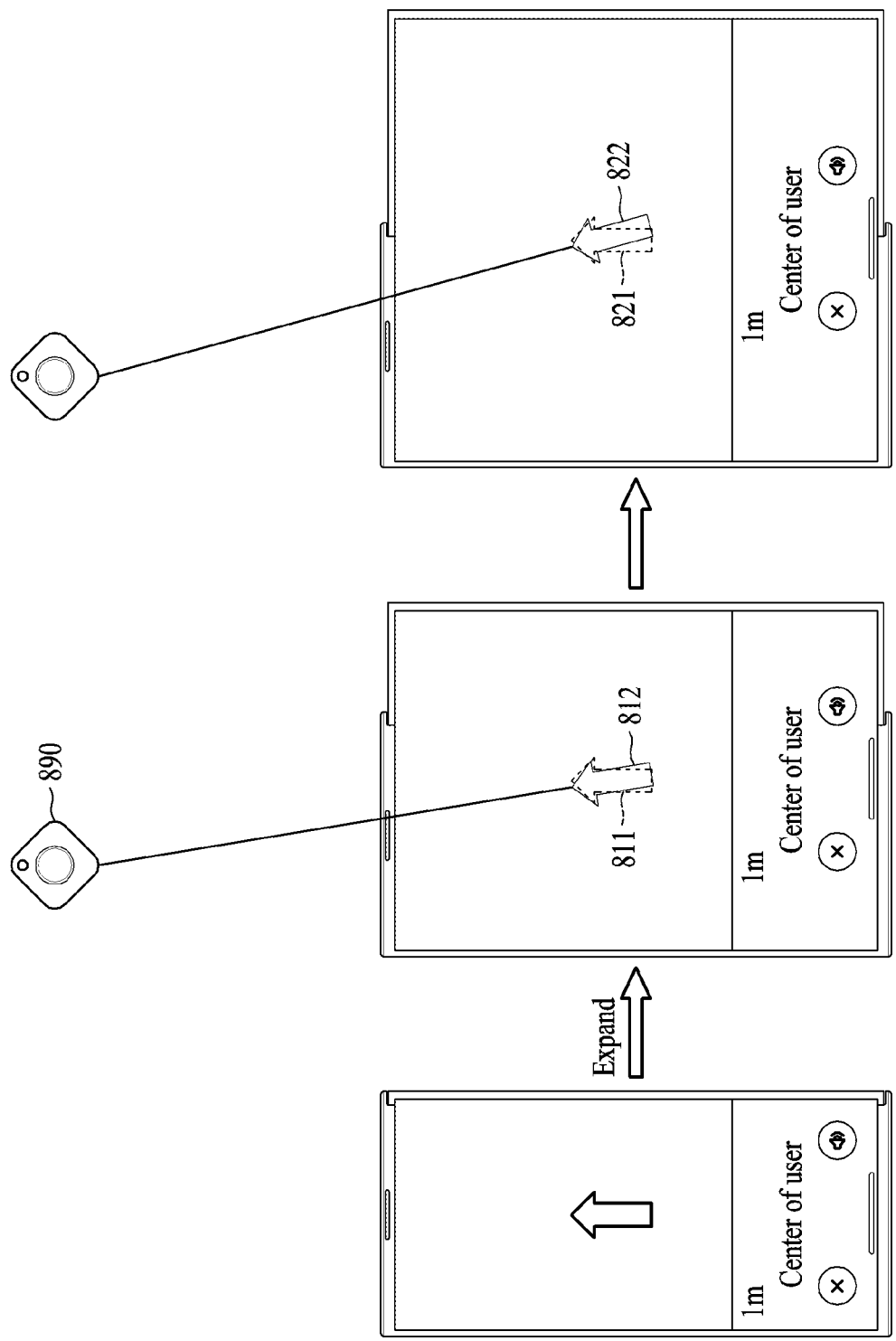

FIGS. 6 through 8 are diagrams illustrating correcting direction information and outputting a graphical element when a display reference point moves while a sensing reference point is fixed in an electronic device according to an example embodiment.

While an event to change a size of a viewable region 760 of a display module is not being detected (or generated or received), an electronic device (e.g., the electronic device 101 and the processor 120 of FIG. 1) may obtain a first sensing value of a sensor module (e.g., the sensor module 176 of FIG. 1). The electronic device may determine first direction information indicating a direction from a first display reference point 711 toward an external location based on the first sensing value. The first display reference point 711 may be a point in the viewable region 760 serving as a reference to output a graphical element before a size of the viewable region 760 is changed and may be a point indicating a location of the electronic device.

In operation 610, the electronic device may detect (or identify or receive) the event to change the size of the viewable region 760 while the sensor module is fixed. For example, the electronic device may detect a change in the size of the viewable region 760 induced by driving of a motor and/or an external force.

In operation 620, the electronic device may obtain the changed size of the viewable region 760. For example, when the electronic device changes the size of the viewable region 760 through driving of a motor, the electronic device may predict a size (e.g., a length of one axis) of the viewable region 760 after the change based on motor driving information (e.g., a number of rotations of a motor and a length changed per rotation). As another example, the electronic device may obtain an additional size (e.g., an added length) compared to a default size (e.g., a default length) in the viewable region 760 through sensing by a display length detection module. In the viewable region 760, the length added to the default length may be referred to as an extended length "e". For example, the electronic device may obtain the extended length "e" corresponding to an added region of the viewable region 760.

In operation 630, the electronic device may calculate a travel length "s" of a graphical element (e.g., a direction graphic representation). For example, the electronic device may calculate the travel length "s" of a first graphical element according to the change in the size of the viewable region 760. The electronic device may determine the travel length "s" of the display reference point based on the changed size obtained in operation 620. A second display reference point 712 may be a display reference point shown after the size of the viewable region 760 is changed and may be a point moved by the travel length "s" from the first display reference point 711. In an example illustrated in FIG. 7, a display reference point may be located at a center of an application screen on one axis (e.g., an x-axis) and may be moved by half the above-described extended length "e". The electronic device may determine that half the extended length "e" is the travel length "s" of the display reference point. A direction graphic representation output on the display reference point may also be moved by the travel length "s".

According to a comparative embodiment, points 721 on which graphic representations determined based on the first direction information from the second display reference point 712 are displayed may deviate from a line corresponding to a direction from the second display reference point 712 toward a physical location of an actual object 790. In addition, an error in locations of the points 721 on which the location graphic representations are displayed may occur, and an error in a direction indicated by the direction graphic representation displayed on the second display reference point 712 may also occur. In a comparative embodiment, although the first direction information based on the first sensing value of the sensor module and second direction information based on a second sensing value are the same, an error may occur because the display reference point is changed. In a comparative embodiment, an error corresponding to a location difference (e.g., the travel length "s") between the second display reference point 712 and the first display reference point 711 may occur. As the extended length "e" increases the travel length "s" increases, and accordingly, an error between the second direction information without correction and the direction toward the actual object 790 may increase. For convenience of description, an example in which the viewable region 760 of the display module is expanded is mainly described, but examples are not limited thereto. In a comparative embodiment, a similar error may occur even when the size of the viewable region 760 decreases.

In operation 640, the electronic device may correct direction information based on a sensing value of the sensor module. According to an example embodiment, the electronic device may correct the second direction information (e.g., a corrected angle "b" between an x-axis and a direction from the second display reference point 712 toward an external location) based on the travel length "s" of the first graphical element (e.g., the direction graphic representation), a distance "D" to the physical location corresponding to the first graphical element, and the first direction information (e.g., an angle "a" between the x-axis and a direction from the first display representation point 711 toward the external location).

For example, the electronic device may calculate a length of one axis (e.g., a length of an x-axis) dx and a length of another axis (e.g., a length of a y-axis) dy between the object 790 and the first display reference point 711. The electronic device may obtain the length of the one axis dx and the length of the other axis dy by a calculation based on dx=D×cos(a) and y=D×sin(a). The electronic device may calculate the corrected angle "b" based on b=tan−1(dy/(dx+s)). As a size change amount of the viewable region 760 increases, the travel length "s" of the display reference point may increase. A larger correction value may be applied to a graphical element corresponding to the object 790 displayed far from the display reference point in a y-axis direction in the application screen.

As another example, the electronic device may correct the second direction information using calibration information. The calibration information may include a previously calculated correction value for a sensing value of the at least one sensor module. The calibration information may include correction values corresponding to travel lengths of the first graphical element (e.g., the direction graphic representation disposed on the display reference point) for a plurality of sensing values of the at least one sensor module. The correction value of the calibration information may be calculated and stored in advance for each of travel lengths, distances between an external location and the electronic device, and lengths added to a default length in the viewable region 760.

In operation 650, the electronic device may output the graphical element using corrected direction information. For example, the electronic device may generate a second graphical element by applying, to the first graphical element, at least one among a rotation in a first rotational direction and a movement in a first moving direction based on an increase in the viewable region 760 while the at least one sensor module is fixed. As another example, the electronic device may generate the second graphical element by applying, to the first graphical element, at least one among a rotation in a second rotational direction different from the first rotational direction and a movement in a second moving direction different from the first moving direction based on a decrease in the viewable region 760 while the at least one sensor module is fixed. The electronic device may output the second graphical element generated by applying, to the first graphical element, at least one among a rotation by an angle corresponding to the size change amount of the viewable region 760 and a movement by a displacement corresponding to the size change amount. For example, as illustrated in FIG. 7, the electronic device may dispose and output location and direction graphic representations of points 722 on a line corresponding to the corrected second direction information from the second display reference point 712.

FIG. 7 mainly describes correction of a location and direction graphic representation, and FIG. 8 describes correction of a direction graphic representation. For example, an electronic device may output a second graphical element (e.g., a second direction graphic representation 812) generated by rotating a first graphical element (e.g., a first direction graphic representation 811) corresponding to first direction information in response to an expansion event of a viewable region. The electronic device may output a second direction graphic representation 822 generated by rotating a first direction graphic representation 821 even when the viewable region is expanded by a second size change amount greater than a first size change amount.

FIGS. 9 through 12 are diagrams illustrating correcting direction information and outputting a graphical element when a sensing reference point moves in an electronic device according to an example embodiment.

In operation 910, an electronic device (e.g., the electronic device 101 and the processor 120 of FIG. 1) may detect (or identify or receive) an event to change a size of a viewable region 1060 accompanying a movement of a sensor module (e.g., the sensor module 176 of FIG. 1). The sensor module may be moved alone while a display reference point is fixed, or both of the sensor module and the display reference point may be moved. FIGS. 9 through 11 illustrate examples in which a sensor module is moved while a display reference point is fixed. FIG. 12 illustrates an example in which both of a display reference point and a sensor module are moved.

In operation 920, the electronic device may obtain a changed size of the viewable region 1060 while a location of a graphical element (e.g., a direction graphic representation) is fixed. The electronic device may determine an extended length "e" compared to a default length in the viewable region 1060. An application screen that guides a direction of an object 1090 may be output on a default region corresponding to a default size of the viewable region 1060. Another application screen may be output on a region added to the default size. A size of the application screen that guides the direction of the object 1090 may remain the same. A display reference point 1010 in the application screen may also remain the same. Although the display reference point 1010 is fixed, second direction information obtained after a screen is expanded in response to a movement of a sensor module may be different from first direction information.

In a comparative embodiment, a point 1031 determined based on the second direction information based on a second sensing value obtained at a second location 1022 that is a changed location of the sensor module may be different from a point 1032 determined based on the first direction information. As described above, a location graphic representation representing the object 1090 may need to be displayed on the point 1032 determined based on the first direction information because the size of the application screen and the display reference point 1010 are not changed. The above-described error may increase as a movement amount of the sensor module increases. A direction graphic representation displayed on the display reference point 1010 may also need to remain the same because the application screen is not changed as described above. However, an error may occur because the direction graphic representation rotates due to the second direction information changed by the movement of the sensor module.

In operation 930, the electronic device may stop the sensor module from sensing. For example, in response to detecting an event in which the sensor module is moved from a first location 1021 to the second location 1022 while the display reference point 1010 is fixed, the electronic device may deactivate sensing by the sensor module.

In operation 940, the electronic device may monitor a rotation of the electronic device. The electronic device may monitor whether the electronic device rotates by an angle greater than or equal to a threshold angle on a display plane (e.g., an xy plane) based on a 6-axis sensor (e.g., an acceleration sensor and a gyro sensor). In response to not rotating by the angle greater than or equal to the threshold angle, the electronic device may continuously stop the sensor module from sensing. The electronic device may stop at least one sensor module from sensing while the at least one sensor module is moved by a change in a size of the viewable region 1060. The electronic device may maintain a graphical element (e.g., a location graphic representation and/or a direction graphic representation) displayed on an application screen by preventing the sensor module from obtaining a second sensing value. For example, the electronic device may output a second graphic representation identical to a first graphic representation based on the at least one sensor module being moved by the change in the size of the viewable region 1060 while a location of the first graphical element is fixed.

In operation 950, the electronic device may correct direction information based on a sensing value of the sensor module. In response to rotating by the angle greater than or equal to the threshold angle (if yes in operation 940), the electronic device may allow the sensor module to resume sensing. For example, in response to an occurrence of the above-described event (e.g., an event in which a sensor module is moved while a display reference point is fixed), the electronic device may record a correction value calculated based on first direction information. The electronic device may apply the correction value to second direction information obtained through sensing by the at least one sensor module.

For example, in response to the occurrence of the event, the electronic device may calculate prediction direction information corresponding to the size of the viewable region 1060 changed by the event. The prediction direction information may be direction information based on a predicted sensing value to be sensed by the sensor module at the second location 1022. The prediction direction information may include a prediction angle "c" formed between a direction from the second location 1022 toward the object 1090 and one axis (e.g., an x-axis). The electronic device may obtain a length of the one axis "dx" and a length of another axis "dy" based on an angle "a" according to the first direction information and a distance "D" between the object 1090 and the sensor module. A travel length "s" of the sensor module may be equal to an extended length "e". The electronic device may calculate a prediction angle "c" based on c=tan−1(dy/(dx+s)). The electronic device may calculate a correction value based on the prediction direction information and the first direction information. The electronic device may obtain a correction value by calculating a difference between the prediction angle "c" and the angle "a" according to the first direction information. The electronic device may correct the second direction information by applying the calculated correction value to the second direction information obtained based on the second sensing value of the sensor module. For example, the electronic device may subtract the calculated correction value from the second direction information.

The electronic device may output a second graphical element using the corrected second direction information. The electronic device may output a location graphic representation on the point 1032 on a line corresponding to the corrected second direction information from the display reference point 1010.

Figure 11:
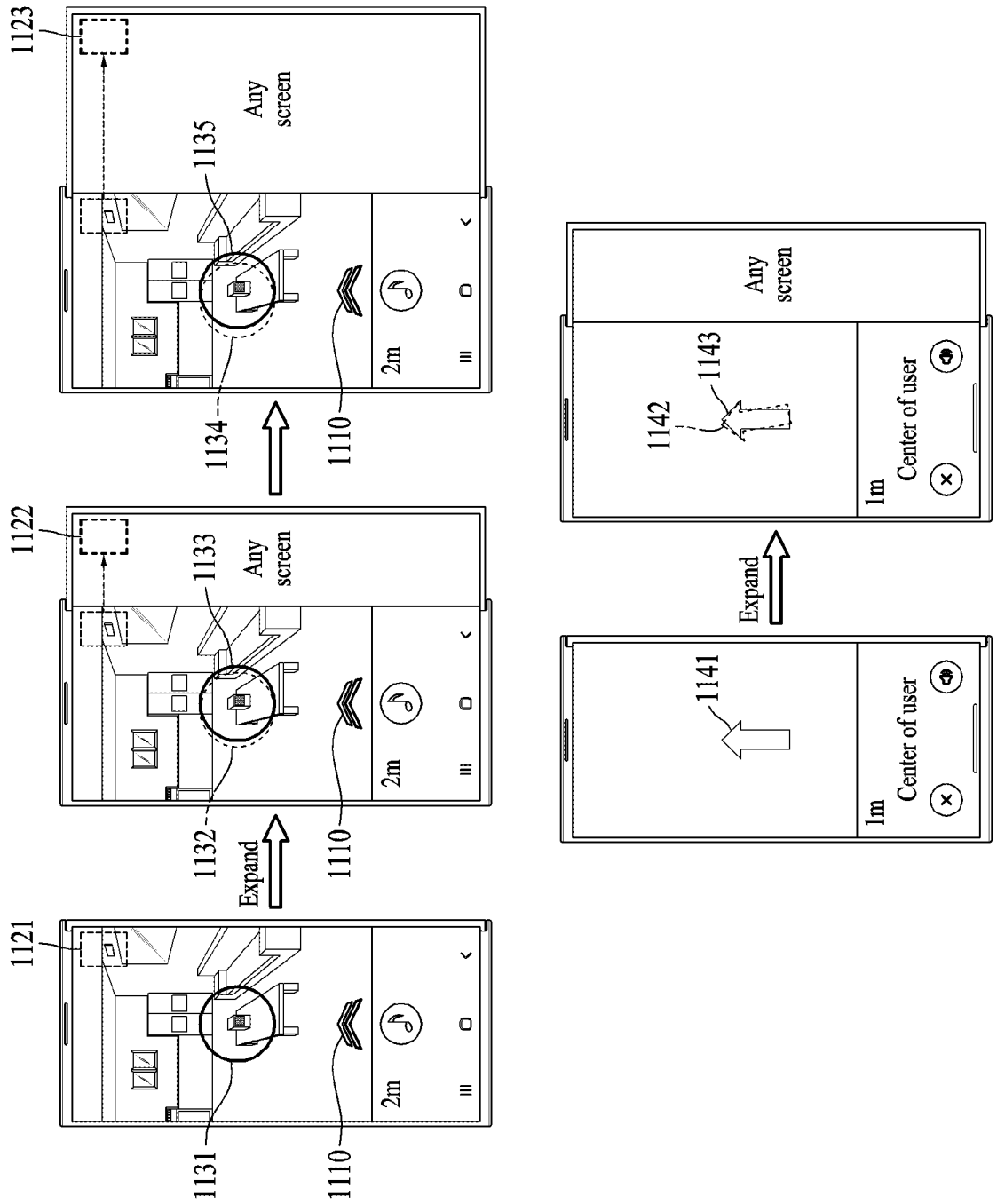
Figure 12:
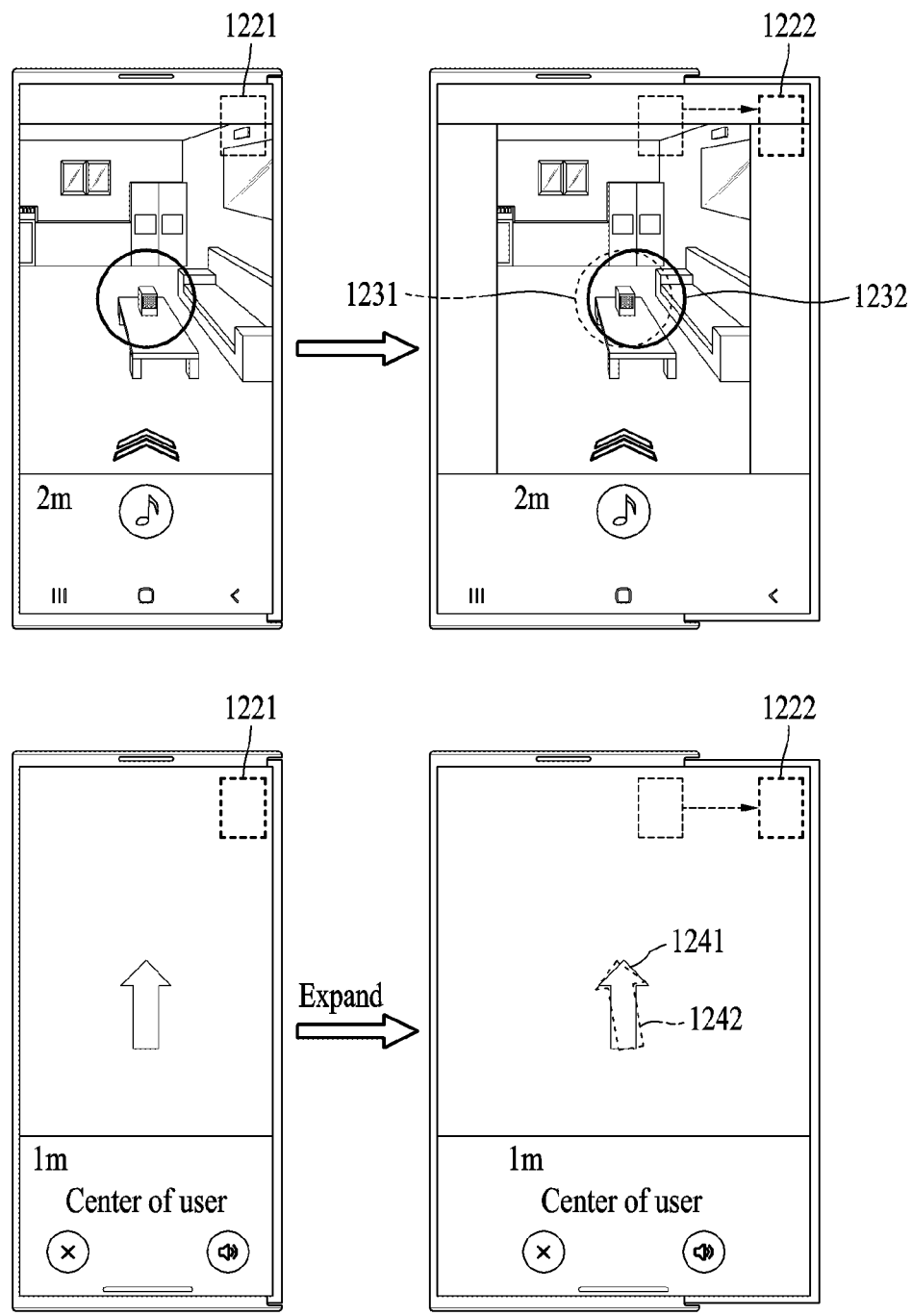

For example, as illustrated in FIG. 11, the electronic device may output a graphical element based on a fixed display reference point 1110 despite screen expansion. For example, the electronic device may output a first graphical element (e.g., a first location graphic representation) on a point 1131 corresponding to first direction information based on a first sensing value sensed by a sensor module at a first location 1121. The electronic device may correct second direction information based on a second sensing value of the sensor module moved to a second location 1122, 1123 by expansion of the viewable region 1060. The electronic device may output a second location graphic representation on a point 1133, 1135 corresponding to the corrected second direction information instead of a point 1132, 1134 corresponding to the second direction information. When the rotation by the angle less than the threshold angle is maintained while the electronic device is in a pose, a point 1133, 1135 corresponding to the corrected second direction information may be the same as the point 1131 corresponding to the first direction information. In addition, the electronic device may output a direction graphic representation 1143 corresponding to the corrected second direction information instead of a direction graphic representation 1142 corresponding to the second direction information (e.g., the second direction information before correction) based on the second sensing value of the sensor module moved by the expansion of the viewable region 1060. The direction graphic representation 1143 corresponding to the corrected second direction information may indicate a same direction as a direction graphic representation 1141 based on the first direction information. Accordingly, the electronic device may display an object on a point of which a location is identical to a location of an existing display point by applying the correction value to the second direction information in which an error occurs.

FIG. 12 illustrates an example in which both of a sensor module and a display reference point are moved. An electronic device may calculate prediction direction information corresponding to half a size changed by an event in a viewable region based on a first graphical element (e.g., a direction graphic representation displayed on a display reference point) and at least one sensor module (e.g., the sensor module 176 of FIG. 1) being moved by a change in a size of the viewable region. For example, the electronic device may determine that a travel length "s" of a sensor module is half an extended length "e". This may be because an error is halved compared to the embodiment described above with reference to FIG. 10 as the display reference point is moved by a length corresponding to a length half the extended length "e". The prediction direction information may include a prediction angle "c" formed between a direction from the moved location of the sensor module toward an object and an axis (e.g., an x-axis). The electronic device may obtain a length of an axis "dx" and a length of another axis "dy" based on an angle "a" according to the first direction information and a distance "D" between the object and the sensor module. The electronic device may calculate a prediction angle "c" based on c=tan−1(dy/(dx+s)). The electronic device may calculate a correction value based on the prediction direction information and the first direction information. The electronic device may obtain a correction value by calculating a difference between the prediction angle "c" and the angle "a" according to the first direction information. The electronic device may apply the correction value to second direction information.

The electronic device may output the first graphical element (e.g., a first location graphic representation and/or a second location graphic representation) using the first direction information based on a first sensing value sensed by the sensor module at a first location 1221. The electronic device may correct the second direction information based on a second sensing value sensed by the sensor module at a second location 1222 using the above-described correction value. When there is no correction, a point 1231 and a direction 1241 based on the second direction information may include an error. The electronic device may perform at least one of outputting the second location graphic representation on a point 1232 corresponding to the corrected second direction information and/or outputting a direction graphic representation indicating a direction 1242 corresponding to the corrected second direction information. Thus, when the sensor module is moved according to the change in the size of the viewable region, the electronic device may remeasure direction information through the sensor module and correct the remeasured direction information based on a changed display reference point to display a graphical element representing a location and/or a direction of an object on a display module.

In addition, hereinafter, an example in which a displacement of a camera module is applied to displaying of a location of an object when the camera module is moved while the object is being displayed on an AR image is described.

Figure 13:
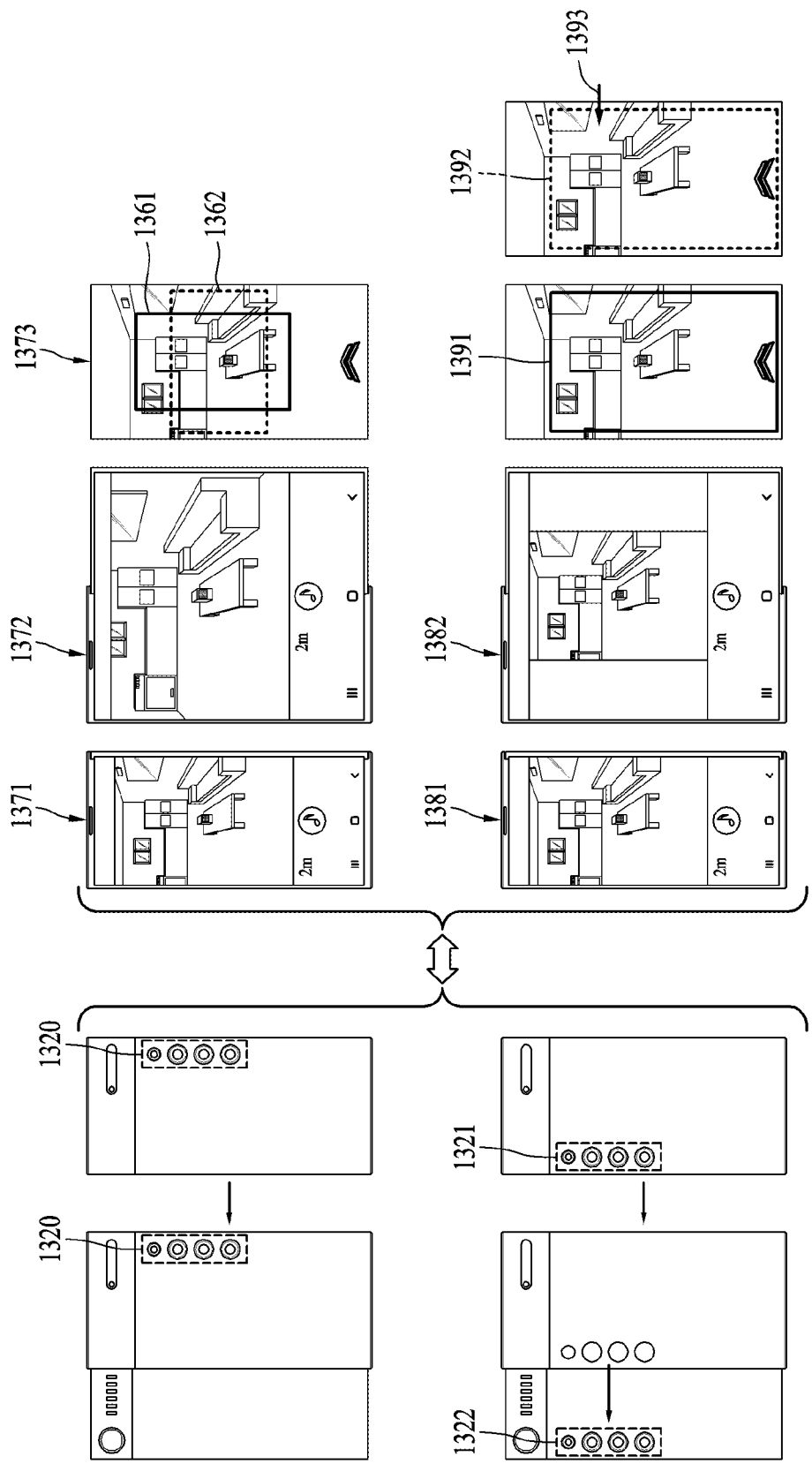
FIG. 13 is a diagram illustrating adjusting a field of view (FOV) of a camera image according to a change in a size of a viewable region in an electronic device according to an example embodiment.

FIG. 13 is a diagram illustrating adjusting a field of view (FOV) of a camera image according to a change in a size of a viewable region in an electronic device according to an example embodiment.

According to an example embodiment, at least one sensor module (e.g., the sensor module 176 of FIG. 1) of an electronic device (e.g., the electronic device 101 of FIG. 1) may include a camera module (e.g., the camera module 180 of FIG. 1). As illustrated in FIG. 13, in response to a change in a size of a viewable region of the electronic device, a camera module may remain at a fixed location 1320 or be moved from a first location 1321 to a second location 1322.

For example, in response to a first graphical element being moved without a camera module being moved, the electronic device may output an image cropped by adjusting an FOV with a targeted object as a center in an image obtained based on the camera module. As another example, in response to the camera module being moved, the electronic device may output an image cropped to fit an FOV determined based on a moving distance of the camera module and the targeted object from the camera image obtained based on the camera module. The electronic device may crop the camera image to an FOV shifted in a direction opposite to a moving direction of the camera module such that the targeted object is targeted at a center of the FOV. A pixel shift amount may vary depending on a distance between the object and the electronic device and the moving distance of the camera module. The electronic device may determine the pixel shift amount based on the distance to the targeted object and/or the moving distance of the camera module and crop the camera image to an FOV shifted by the determined pixel shift amount. The electronic device may track an object while minimizing or reducing recognition (e.g., recognition based on AI analysis) of an object included in the camera image, thereby reducing an amount of computation.

The electronic device may output a graphical element (e.g., a location graphic representation and/or a direction graphic representation) for the targeted object using direction information corrected according to the descriptions provided above with reference to FIGS. 1 through 12. The electronic device may generate an AR image by overlaying the graphical element on the cropped image.

The electronic device may output the AR image without a margin region. When there is no margin region, a display reference point may be moved according to a change in a size of a viewable region, and a size of the AR image may also vary. The electronic device in a closed state 1371 may crop a partial image of an original camera image 1373 corresponding to a first FOV 1361 corresponding to an aspect ratio of the closed state 1371. The electronic device in an open state 1372 may crop a partial image of the original camera image 1373 corresponding to a second FOV 1362 corresponding to an aspect ratio of the open state 1372. The second FOV 1362 may have a range that is horizontally wider and vertically narrower than that of the first FOV 1361. The electronic device may shift a region cropped from the original camera image 1373 in a direction opposite to a moving direction of the camera module based on a movement of the camera module. The moving direction of the camera module may be parallel to an expansion direction and a reduction direction of the viewable region.

As another example, the electronic device may output an AR image of which a size remains the same despite the change in the size of the viewable region. In this example, a size of the image cropped from the original camera image may remain the same. The electronic device may output the AR image of the same size in the closed state 1381 and the open state 1382. In response to the camera module being moved when the viewable region is expanded, the electronic device may shift the image cropped from the original camera image from a first FOV region 1391 to a second FOV region 1392. The second FOV region 1392 may be a region moved in a direction 1393 opposite to the moving direction of the camera module compared to the first FOV region 1391.

The electronic device may provide an object targeted at a center of an application screen and a graphical element to a user regardless of the change in the size of the viewable region.

Figure 14:
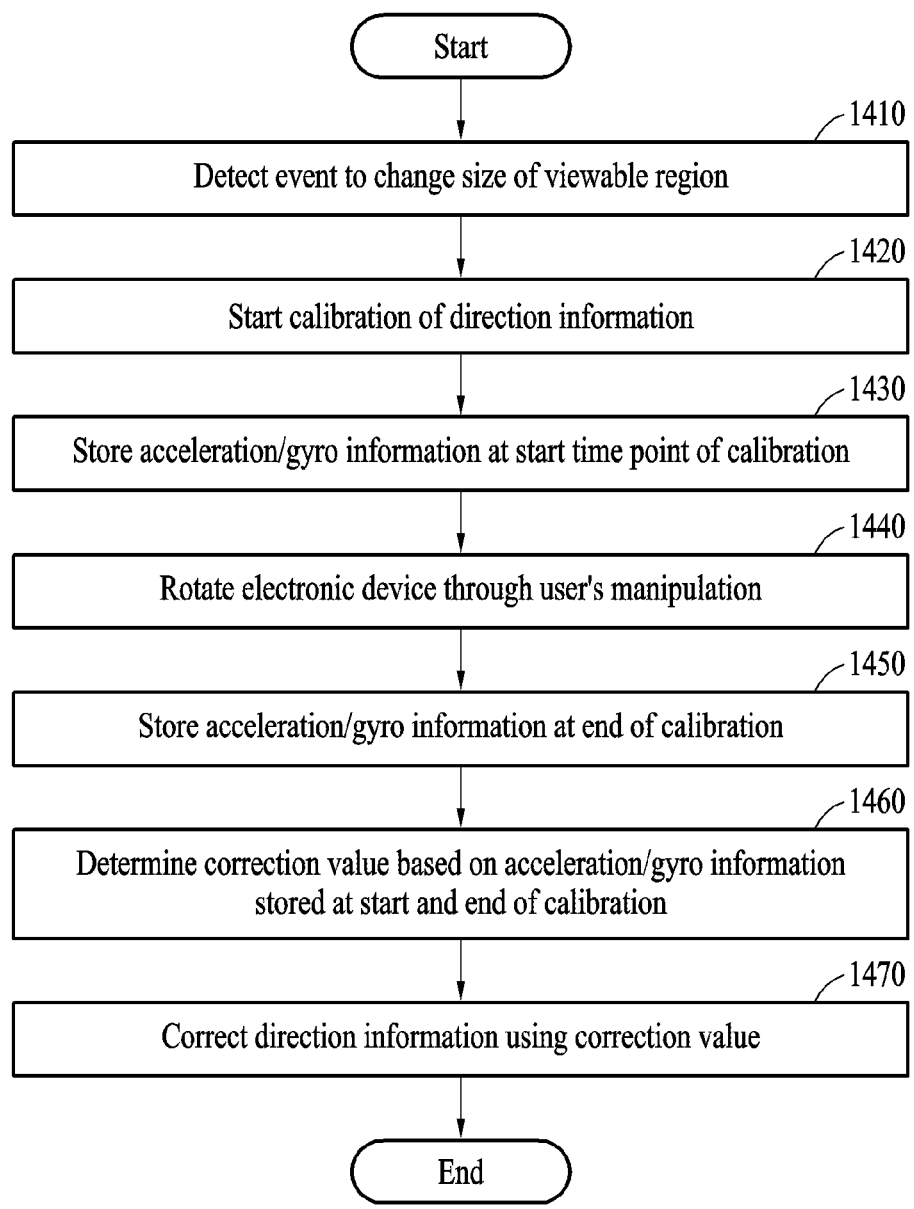
FIGS. 14 and 15 are diagrams illustrating a calibration operation of obtaining a correction value based on a user input in an electronic device according to example embodiment(s).
Figure 15:
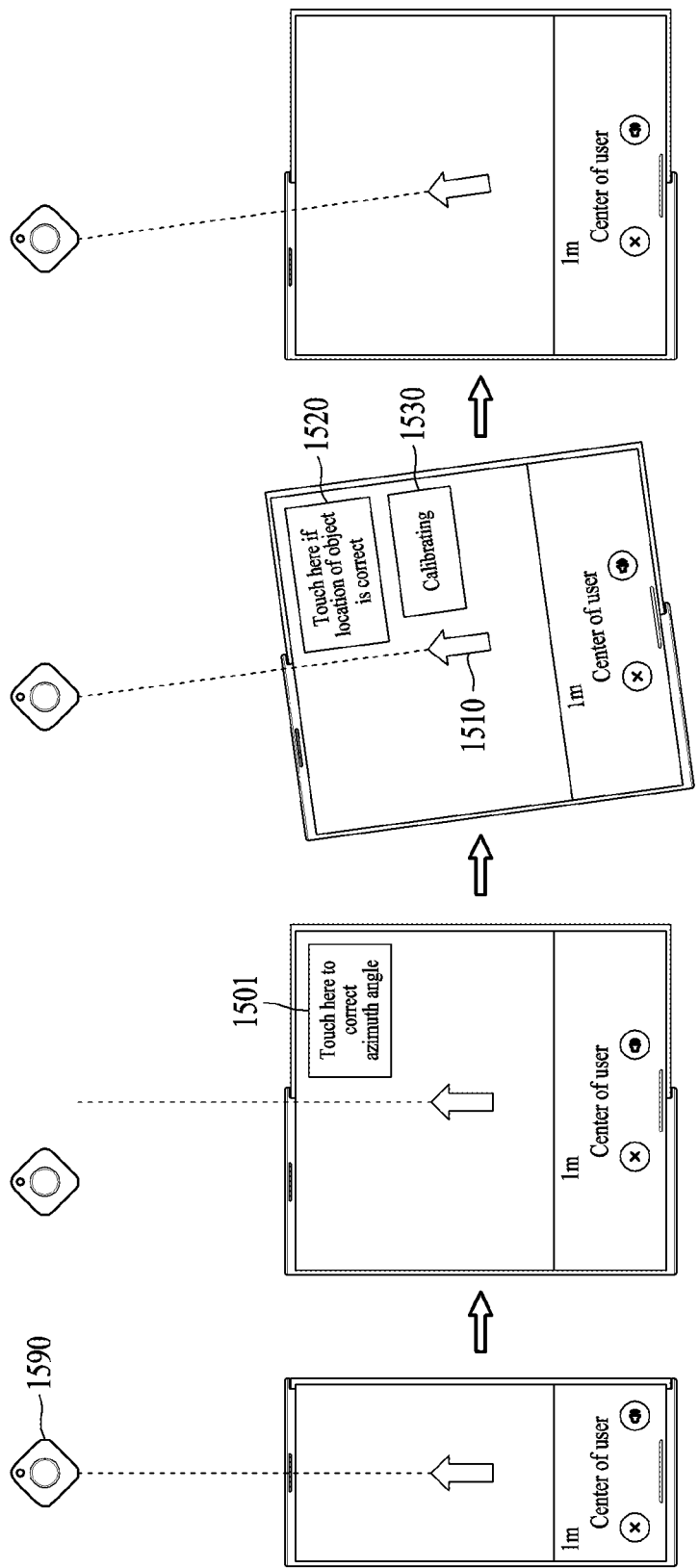

FIGS. 14 and 15 are diagrams illustrating a calibration operation of obtaining a correction value based on a user input in an electronic device according to an example embodiment.

In operation 1410, an electronic device (e.g., the electronic device 101 and the processor 120 of FIG. 1) may detect (or identify or receive) an event to change a size of a viewable region.

In operation 1420, the electronic device may start calibration of direction information. For example, the electronic device may perform calibration of direction information of at least one sensing module based on a user input. If there is an error between a graphical element output after the size of the viewable region is changed and a direction toward an actual object 1590, the electronic device may enter a calibration operation mode through the user input. The user input may be an input for selecting an object 1501 to start the calibration. In response to detecting an event to change the size of the viewable region, the electronic device may output the object 1501 to start the calibration.

In operation 1430, the electronic device may store acceleration information and/or gyro information at a start time point during the calibration. As another example, the electronic device may calculate and store direction information before the calibration based on sensor information (e.g., the acceleration information and the gyro information) obtained at the start of the calibration.

In operation 1440, the electronic device may be rotated by a user's manipulation. The electronic device may monitor the acceleration information and the gyro information of the electronic device during the calibration. For example, the electronic device may output a direction graphic representation 1510 for the calibration on a display reference point. During the above-described rotation of the electronic device in the pose, the electronic device may output the direction graphic representation 1510 in a fixed direction (e.g., a front direction along a y-axis of the electronic device) in the viewable region. The electronic device may be rotated by the user until a direction of the direction graphic representation 1510 matches the object 1590.

For reference, the electronic device may output an indication 1530 indicating that direction information is being corrected. FIG. 15 illustrates an example in which the indication 1530 is output while the electronic device enters the calibration mode, but examples are not limited thereto. For example, as illustrated in FIGS. 1 through 14, the indication 1530 indicating that the direction information is being corrected is output while the size of the viewable region is being changed, and automatic correction of the direction information may be performed.

In operation 1450, the electronic device may store the acceleration information and/or the gyro information at the end of the calibration. In response to an end input of the user who determines that the corrected direction graphic representation 1510 is directed to the actual object 1590, the electronic device may end the calibration. The end input may be an input for selecting an object 1520 to end the calibration. The electronic device may calculate and store direction information (e.g., the acceleration information and the gyro information) after the calibration based on the sensor information obtained at the end of the calibration.

In operation 1460, the electronic device may determine a correction value based on the acceleration information and/or the gyro information stored at the start and end of the calibration. For example, the electronic device may determine a correction value for the direction information based on the acceleration information and the gyro information obtained at the end of the calibration. The electronic device may determine the direction information before the calibration based on the sensor information (e.g., the acceleration information and the gyro information) obtained at the start of the calibration and determine the direction information (e.g., the acceleration information and the gyro information) after the calibration based on the sensor information obtained at the end of the calibration. The electronic device may obtain a correction value by calculating a difference between the direction information after the calibration and the direction information before the calibration. The direction information before and after the calibration may be determined based on at least one among the above-described acceleration information, gyro information, and a geomagnetic field value. "Based on" as used herein covers based at least on.

The electronic device may correct the second direction information by applying the calculated correction value to the second direction information based on the second sensing value of the sensor module (e.g., see operation 1470 in FIG. 14).

Each embodiment herein may be used in combination with any other embodiment(s) described herein.

According to an example embodiment, the electronic device may provide a correct indication directed to an object by correcting an error caused by a change in a size of a viewable region, a movement of a sensor module, and a movement of a graphical element.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   at least one sensor module, comprising at least one sensor, configured to calculate direction information, wherein the direction information comprises at least one of an azimuth angle indicating true north and a direction of an object recognized via the at least one sensor module;
   a display module, comprising a display, configured to change a size of a viewable region viewed from one side by changing a dimension of the display;
   a display length detection module, comprising circuitry, configured to calculate the size of the viewable region;
   a memory configured to store computer-executable instructions; and
   at least one processor, comprising processing circuitry, configured to execute the instructions by accessing the memory, and configured to:
   control to output, via the display of the display module, a first graphical element corresponding to first direction information calculated based on a first sensing value received from the at least one sensor module;
   monitor a change in a relative location between at least the first graphical element being currently output and the at least one sensor module based on an occurrence of an event to change the size of the viewable region;
   correct, based on the change in the relative location, second direction information calculated based on a second sensing value received from the at least one sensor module based on a determination that the relative location is changed; and
   control to output, via the display of the display module, a second graphical element corresponding to the corrected second direction information.

2. The electronic device of claim 1, wherein the at least one sensor module comprises at least one of: a geomagnetic sensor, a communication module comprising communication circuitry configured to establish communication with an external device, a positioning module comprising circuitry, a distance sensor configured to detect a distance to an object, and a vision sensor configured to detect an object.

3. The electronic device of claim 1, wherein the processor is further configured to:
   generate the second graphical element at least by applying, to the first graphical element, at least one among a rotation in a first rotational direction and a movement in a first moving direction based on an increase in the viewable region while the at least one sensor module is fixed; and
   generate the second graphical element at least by applying, to the first graphical element, at least one among a rotation in a second rotational direction different from the first rotational direction and a movement in a second moving direction different from the first moving direction based on a decrease in the viewable region while the at least one sensor module is fixed.

4. The electronic device of claim 1, wherein the processor is further configured to:
   control to output the second graphical element generated at least by applying, to the first graphical element, at least one among a rotation by an angle corresponding to a size change amount of the viewable region and a movement by a displacement corresponding to the size change amount.

5. The electronic device of claim 3, wherein the processor is further configured to:

calculate a travel length of the first graphical element based on the change in the size of the viewable region; and correct the second direction information based on the travel length of the first graphical element, a distance to a physical location corresponding to the first graphical element, and the first direction information.

6. The electronic device of claim 3, wherein the processor is further configured to:

correct the second direction information based on calibration information comprising correction values corresponding to travel lengths of the first graphical element for a plurality of sensing values of the at least one sensor module.

7. The electronic device of claim 1, wherein the processor is further configured to:

control to output a second graphic representation identical to the first graphical element based on the at least one sensor module being moved by the change in the size of the viewable region while a location of the first graphical element is fixed.

8. The electronic device of claim 7, wherein the processor is further configured to:

stop the at least one sensor module from sensing while the at least one sensor module is moved by the change in the size of the viewable region.

9. The electronic device of claim 7, wherein the processor is further configured to:

record a correction value calculated based on the first direction information in response to an occurrence of the event; and apply the correction value to the second direction information obtained through sensing by the at least one sensor module.

10. The electronic device of claim 9, wherein the processor is further configured to:

in calculate prediction direction information corresponding to a size changed by the event in the viewable region in response to the occurrence of the event; and calculate the correction value based on the prediction direction information and the first direction information.

11. The electronic device of claim 9, wherein the processor is further configured to:

calculate prediction direction information corresponding to half a size changed by the event in the viewable region based on the first graphical element and the at least one sensor module being moved by the change in the size of the viewable region;

calculate a correction value based on the prediction direction information and the first direction information; and apply the correction value to the second direction information.

12. The electronic device of claim 1, wherein the processor is further configured to:

control to output, on the display of the display module, the second graphical element using the second direction information calculated based on the second sensing value based on the relative location being maintained.

13. The electronic device of claim 1, wherein the at least one sensor module comprises a camera module comprising a camera, and the processor is further configured to:

output an image cropped by adjusting a field of view (FOV) with a targeted object as a center from an image obtained through the camera module in response to the first graphical element being moved without the camera module being moved.

14. The electronic device of claim 1, wherein the at least one sensor module comprises a camera module comprising a camera, and the processor is further configured to:

control to output an image cropped to fit an FOV determined based on a moving distance of the camera module and the targeted object from the camera image obtained based on the camera module.

15. The electronic device of claim 14, wherein the processor is further configured to:

crop the camera image to an FOV shifted in a direction opposite to a moving direction of the camera module such that the targeted object is targeted at a center of an FOV.

16. The electronic device of claim 1, wherein the processor is further configured to:

perform calibration of direction information of the at least one sensor module based on a user input.

17. The electronic device of claim 16, wherein the processor is further configured to:

monitor acceleration information and gyro information of the electronic device during the calibration; and determine a correction value for the direction information based on the acceleration information and the gyro information obtained when the calibration ends.

18. A method implemented by an electronic device comprising a processor, a display, and at least one sensor module comprising a sensor, the method comprising:

outputting, on the display, a first graphical element corresponding to first direction information calculated based on a first sensing value received from the at least one sensor module comprising the sensor, wherein the direction information comprises at least one of an azimuth angle indicating true north and a direction of an object recognized via the at least one sensor module;

monitoring a change in a relative location between the first graphical element being currently output and the at least one sensor module in response to an occurrence of an event to change a size of a viewable region of the display;

correcting, based on the change in the relative location, second direction information calculated based on a second sensing value received from the at least one sensor module in response to a determination that the relative location is changed; and outputting a second graphical element corresponding to the corrected second direction information on the display.

19. A non-transitory computer-readable storage medium storing instructions that, when executed by a processor, are configured to cause the processor to perform the method of claim 18.

* * * * *